US012039942B2

(12) United States Patent
Kim et al.

(10) Patent No.: US 12,039,942 B2
(45) Date of Patent: Jul. 16, 2024

(54) DISPLAY DEVICE AND DRIVING METHOD THEREOF

(71) Applicant: LG DISPLAY CO., LTD., Seoul (KR)

(72) Inventors: Kyu Jin Kim, Paju-si (KR); Seung Taek Oh, Paju-si (KR); Dong Gun Lee, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 64 days.

(21) Appl. No.: 17/846,765

(22) Filed: Jun. 22, 2022

(65) Prior Publication Data

US 2023/0035356 A1 Feb. 2, 2023

(30) Foreign Application Priority Data

Jul. 29, 2021 (KR) ........................ 10-2021-0099665

(51) Int. Cl.

*G09G 3/34* (2006.01)
*G09G 3/3233* (2016.01)
*G09G 3/3266* (2016.01)

(52) U.S. Cl.

CPC ......... *G09G 3/3406* (2013.01); *G09G 3/3233* (2013.01); *G09G 3/3266* (2013.01); *G09G 2300/0452* (2013.01); *G09G 2300/0819* (2013.01); *G09G 2300/0842* (2013.01); *G09G 2310/08* (2013.01); *G09G 2320/0626* (2013.01); *G09G 2320/0686* (2013.01)

(58) Field of Classification Search

None
See application file for complete search history.

(56) References Cited

U.S. PATENT DOCUMENTS

| | | | | |
|---|---|---|---|---|
| 2010/0066800 A1* | 3/2010 | Ryf | H04N 7/144 | 348/340 |
| 2016/0337570 A1* | 11/2016 | Tan | G06F 3/01 | |
| 2019/0082519 A1* | 3/2019 | Gagne-Keats | G01J 3/2803 | |
| 2019/0196635 A1 | 6/2019 | Park et al. | | |
| 2021/0152735 A1* | 5/2021 | Zhou | G06T 5/001 | |
| 2021/0217821 A1 | 7/2021 | Han et al. | | |

FOREIGN PATENT DOCUMENTS

| | | | |
|---|---|---|---|
| CN | 108376696 | A | 8/2018 |
| CN | 108922900 | A | 11/2018 |
| CN | 109859637 | A | 6/2019 |
| CN | 110010069 | A | 7/2019 |
| CN | 111176039 | A | 5/2020 |
| CN | 111383577 | A | 7/2020 |
| CN | 112805836 | A | 5/2021 |
| KR | 10-2019-0088800 | A | 7/2019 |

* cited by examiner

*Primary Examiner* — Frank S Chen
(74) *Attorney, Agent, or Firm* — Birch, Stewart, Kolasch & Birch, LLP

(57) ABSTRACT

A display device can include a display panel to display an input image across a first subpixel region and a second subpixel region; a display panel driver to supply pixel data of the input image to subpixels of the display panel; a light source disposed under the display panel in an area overlapped by the second subpixel region; and a controller to drive the light source in an emission permitting section set within a non-driving period of a group of subpixels among the subpixels that are disposed in at least a portion of the second subpixel region.

18 Claims, 18 Drawing Sheets

DISPLAY DEVICE AND DRIVING METHOD THEREOF

CROSS-REFERENCE TO RELATED APPLICATION

This application claims priority to and the benefit of Korean Patent Application No. 10-2021-0099665, filed in the Republic of Korea on Jul. 29, 2021, the disclosure of which is incorporated herein by reference in its entirety.

BACKGROUND OF THE DISCLOSURE

1. Field

The present disclosure relates to a display device in which an optical device is disposed under a display panel, and a method of driving the same.

2. Discussion of Related Art

Electroluminescent display devices are roughly classified into inorganic light emitting display devices and organic light emitting display devices depending on the materials of the emission layers. The organic light emitting display device of an active matrix type includes an organic light emitting diode (hereinafter, referred to as "OLED") that emits light by itself (e.g., self-emitting), and has an advantage in that the response speed is fast and the luminous efficiency, luminance, and viewing angle are large. In the organic light emitting display device, the OLED is formed in each pixel. The organic light emitting display device not only has a fast response speed, excellent luminous efficiency, luminance, and viewing angle, but also has excellent contrast ratio and color reproducibility since it can express black gray scales in complete black (e.g., true black).

Recently, various optical devices have been added to mobile terminals. Optical devices may include sensors or lighting devices which are required to support multimedia functions or perform biometric recognition. For example, a camera is basically built-in in a smartphone, and the resolution of the camera is increasing to a level of the conventional digital camera. A front camera of a smartphone restricts the design of its screen, making it difficult to design the screen. Although the design of a screen including a notch or a punch hole has been adopted in smartphones to reduce a space occupied by a camera, the size of the screen is still restricted by the front camera, and thus a full-screen display could not be implemented.

SUMMARY OF THE DISCLOSURE

In order to implement a full-screen display, an optical device may be disposed to overlap a screen of a display panel. When a lighting device is disposed under the display panel, a pixel circuit may malfunction due to light emitted from the lighting device.

The present disclosure is to solve the above-described needs and/or problems.

The present disclosure is directed to providing a display device in which a full-screen display is implemented and a malfunction of pixels caused by an optical device disposed under a display panel is prevented, and a method of driving the same.

The problems to be solved by the present disclosure are not limited to those mentioned above, and other problems not mentioned will be clearly understood by those skilled in the art from the following description.

According to an aspect of the present disclosure, there is provided a display device including a display panel on which an input image is displayed in a first pixel region and a second pixel region, a display panel driver configured to write pixel data of the input image in pixels of the display panel, a light source disposed under the display panel to overlap the second pixel region, and a controller configured to drive the light source in an emission permitting section set within a non-driving period of the pixels disposed in at least a portion of the second pixel region.

According to another aspect of the present disclosure, there is provided a method of driving a display device, which includes driving a light source in an emission permitting section set within a non-driving period of pixels disposed in at least a portion of a second pixel region.

BRIEF DESCRIPTION OF THE DRAWINGS

The above and other objects, features and advantages of the present disclosure will become more apparent to those of ordinary skill in the art by describing example embodiments thereof in detail with reference to the accompanying drawings, in which.

DETAILED DESCRIPTION OF THE EMBODIMENTS

Figure 1:
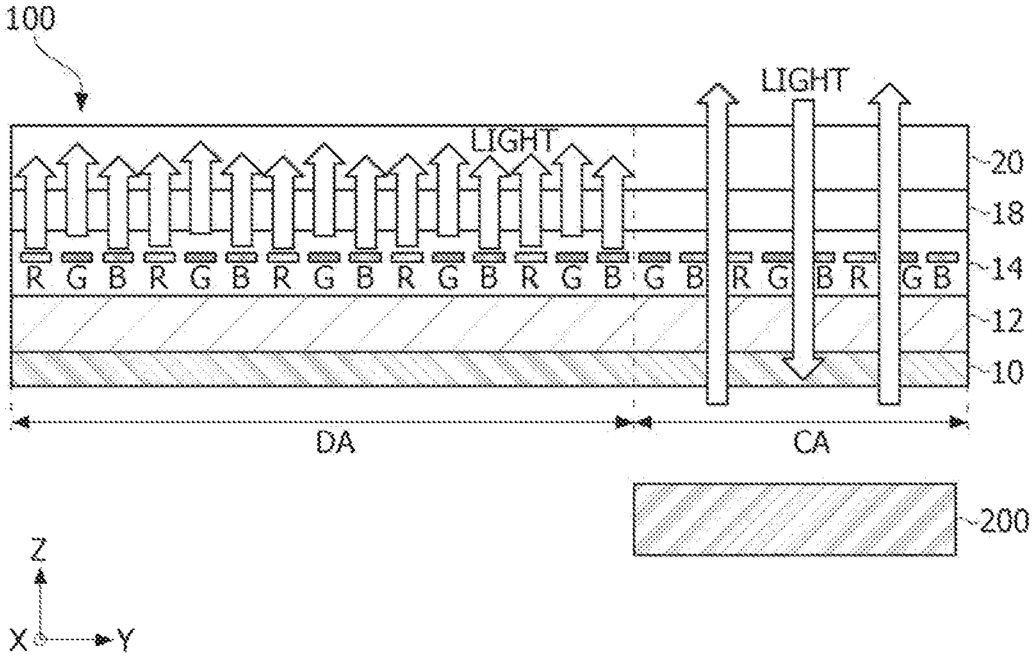
FIG. 1 is a schematic cross-sectional view illustrating a display panel according to an embodiment of the present disclosure.

The advantages and features of the present disclosure and methods for accomplishing the same will be more clearly understood from embodiments described below with reference to the accompanying drawings. However, the present disclosure is not limited to the following embodiments but may be implemented in various different forms. Rather, the present embodiments will make the disclosure of the present disclosure complete and allow those skilled in the art to completely comprehend the scope of the present disclosure. The present disclosure is only defined within the scope of the accompanying claims.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the present specification. Further, in describing the present disclosure, detailed descriptions of known related technologies may be omitted to avoid unnecessarily obscuring the subject matter of the present disclosure.

The terms such as "comprising," "including," "having," and "consist of" used herein are generally intended to allow other components to be added unless the terms are used with the term "only." Any references to singular can include plural unless expressly stated otherwise.

Components are interpreted to include an ordinary error range even if not expressly stated.

When the position relation between two components is described using the terms such as "on," "above," "over," "below," "under," and "next," one or more components can be positioned between the two components unless the terms are used with the term "immediately" or "directly."

The terms "first," "second," and the like can be used to distinguish components from each other, but the functions or structures of the components are not limited by ordinal numbers or component names in front of the components.

The following embodiments can be partially or entirely bonded to or combined with each other and can be linked and operated in technically various ways. The embodiments can be carried out independently of or in association with each other.

In a display device of according to embodiments of the present disclosure, the pixel circuit and the gate driving circuit can include a plurality of transistors. Transistors can be implemented as oxide thin film transistors (oxide TFTs) including an oxide semiconductor, low temperature polysilicon (LTPS) TFTs including low temperature polysilicon, or the like. Each of the transistors can be implemented as a p-channel TFT or an n-channel TFT.

Generally, a transistor is a three-electrode element including a gate, a source, and a drain. The source is an electrode that supplies carriers to the transistor. In the transistor, carriers start to flow from the source. The drain is an electrode through which carriers exit from the transistor. In a transistor, carriers flow from a source to a drain. In the situation of an n-channel transistor, since carriers are electrons, a source voltage is a voltage lower than a drain voltage such that electrons can flow from a source to a drain. The n-channel transistor has a direction of a current flowing from the drain to the source. In the situation of a p-channel transistor, since carriers are holes, a source voltage is higher than a drain voltage such that holes can flow from a source to a drain. In the p-channel transistor, since holes flow from the source to the drain, a current flows from the source to the drain. It should be noted that a source and a drain of a transistor are not fixed. For example, a source and a drain can be changed according to an applied voltage. Therefore, the disclosure is not limited due to a source and a drain of a transistor. In the following description, a source and a drain of a transistor will be referred to as a first electrode and a second electrode.

A gate signal swings between a gate-on voltage and a gate-off voltage. The gate-on voltage is set to a voltage higher than a threshold voltage of a transistor, and the gate-off voltage is set to a voltage lower than the threshold voltage of the transistor.

The transistor is turned on in response to the gate-on voltage and is turned off in response to the gate-off voltage. In the situation of an n-channel transistor, a gate-on voltage can be a gate high voltage VGH and VEH, and a gate-off voltage can be a gate low voltage VGL and VEL. In the situation of the p-channel transistor, the gate-on voltage can be a gate-low voltage VGL and VEL, and the gate-off voltage can be a gate high voltage VGH and VEH.

Hereinafter, various embodiments of the present disclosure will be described in detail with reference to the accompanying drawings.

Figure 2:
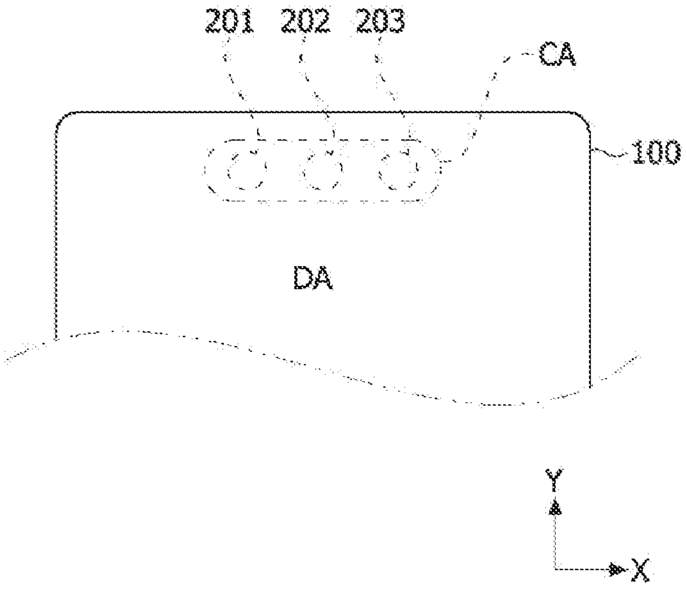
FIG. 2 is a view illustrating a sensing region disposed in a screen of a display panel according to an embodiment of the present disclosure.

Referring to FIGS. 1 and 2, a display panel 100 includes a screen on which an input image is displayed.

The screen of the display panel 100 can include a first pixel region DA and a second pixel region CA. The first pixel region DA is a display region in which a plurality of pixels are disposed and the input image is displayed. The second pixel region CA is a display region in which a plurality of pixels are disposed and a part of the input image is displayed. The pixels in the second pixel region CA can have a pixels per inch (PPI) or resolution less than or equal to that of the first pixel region DA.

The second pixel region CA can include a plurality of light-transmitting parts having no medium for blocking light (e.g., light can easily pass through the second pixel region CA in either direction). The light-transmitting parts can be disposed between subpixels. Light can pass through the light-transmitting parts with little loss. When the PPI or resolution of the pixels in the second pixel region CA is lower than that of the pixels in the first pixel region DA, the light-transmitting parts disposed in the second pixel region CA can be increased.

One or more optical devices 200 that overlap the second pixel region CA can be disposed on a rear surface of the display panel 100. The optical device 200 can include an image sensor, a proximity sensor, a lighting device, and the like. The optical device 200 can include optical elements for facial recognition. The optical device 200 for facial recognition can include an infrared light source 201 and an infrared imaging device 202, which are disposed under the second pixel region CA of the display panel 100. The infrared light source 201 can include a flood illuminator. The infrared imaging device 202 can include an infrared (IR)

camera. The optical device 200 for facial recognition can further include a dot projector 203. The flood illuminator generates an IR flash in dark ambient light to enable facial recognition to be performed even in a dark environment. The dot projector 203 irradiates a user's face with infrared light in the form of a point source of light. The infrared imaging device 202 photographs dots having wavelengths of infrared light formed on a person's face and outputs image data. The infrared imaging device 202 can convert light received by pixels of the image sensor into an electrical signal and convert the electrical signal into digital data to generate the image data.

The first pixel region DA and the second pixel region CA include pixels in which pixel data of the input image is written. Therefore, the input image can be displayed in the first pixel region DA and the second pixel region CA.

Each of the pixels in the first pixel region DA and the second pixel region CA includes subpixels having different colors for color realization. The subpixels include red, green, and blue subpixels. Each of the pixels P can further include a white subpixel. For example, a pixel unit can include three or four subpixels. Each of the subpixels can include a pixel circuit for driving a light-emitting element.

When the PPI or resolution of the pixels in the second pixel region CA is lower than that of the pixels in the first pixel region DA, an image quality compensation algorithm for compensating for a luminance and color coordinates of the pixels in the second pixel region CA can be applied.

In the display device of the present disclosure, since the optical devices 200 are overlapped with the second pixel region CA in which the pixels are disposed, the display region of the screen is not limited by the optical devices 200. Therefore, in the display device of the present disclosure, a full-screen display can be implemented (e.g., a notch design or hole in screen design can be avoided, since the optical devices 200 can be disposed behind the sub-pixels in the second pixel region CA).

The display panel 100 has a width in an X-axis direction, a length in a Y-axis direction, and a thickness in a Z-axis direction. The display panel 100 can include a circuit layer 12 disposed on a substrate, and a light-emitting element layer 14 disposed on the circuit layer 12. A polarizing plate 18 can be disposed on the light-emitting element layer 14, and a cover glass 20 can be disposed on the polarizing plate 18.

The circuit layer 12 can include pixel circuits connected to interconnections such as data lines, gate lines, power lines and the like, a gate driver connected to the gate lines, and the like. The circuit layer 12 can include transistors implemented as thin film transistors (TFTs) and circuit elements such as capacitors or the like. The interconnections and the circuit elements of the circuit layer 12 can include a plurality of insulating layers, two or more metal layers separated from each other with the insulating layers interposed therebetween, and an active layer including a semiconductor material.

The light-emitting element layer 14 can include light-emitting elements driven by the pixel circuits. The light-emitting element can be implemented as an organic light-emitting diode (OLED). The OLED includes an organic compound layer formed between an anode and a cathode. The organic compound layer can include a hole injection layer (HIL), a hole transport layer (HTL), an emission layer (EML), an electron transport layer (ETL), and an electron injection layer (EIL), but the present disclosure is not limited thereto. When voltages are applied to the anode and the cathode of the OLED, holes passing through the HTL and electrons passing through the ETL are moved to the EML to form excitons, and visible light is emitted from the EML. The light-emitting element layer 14 can be disposed on pixels that selectively transmit wavelengths of red, green, and blue light, and can further include a color filter array.

The light-emitting element layer 14 can be covered by a protective layer, and the protective layer can be covered by an encapsulation layer. The protective layer and the encapsulation layer can have a multi-insulating film structure in which an organic film and an inorganic film are alternately stacked. The inorganic film blocks penetration of moisture or oxygen. The organic film planarizes a surface of the inorganic film. When the organic film and the inorganic film are stacked in multiple layers, a movement path of the moisture or oxygen becomes longer than when the organic film and the inorganic film are formed as a single layer, and thus the penetration of moisture/oxygen affecting the light-emitting element layer 14 can be effectively blocked.

The polarizing plate 18 can be adhered onto the encapsulation layer. The polarizing plate 18 enables outdoor visibility of the display device to be improved. The polarizing plate 18 reduces an amount of light reflected by a surface of the display panel 100 and blocks light reflected by a metal of the circuit layer 12, and thus brightness of the pixels is improved. The polarizing plate 18 can be implemented as a polarizing plate in which a linear polarizing plate and a phase delay film are bonded, or a circular polarizing plate.

Figure 3:
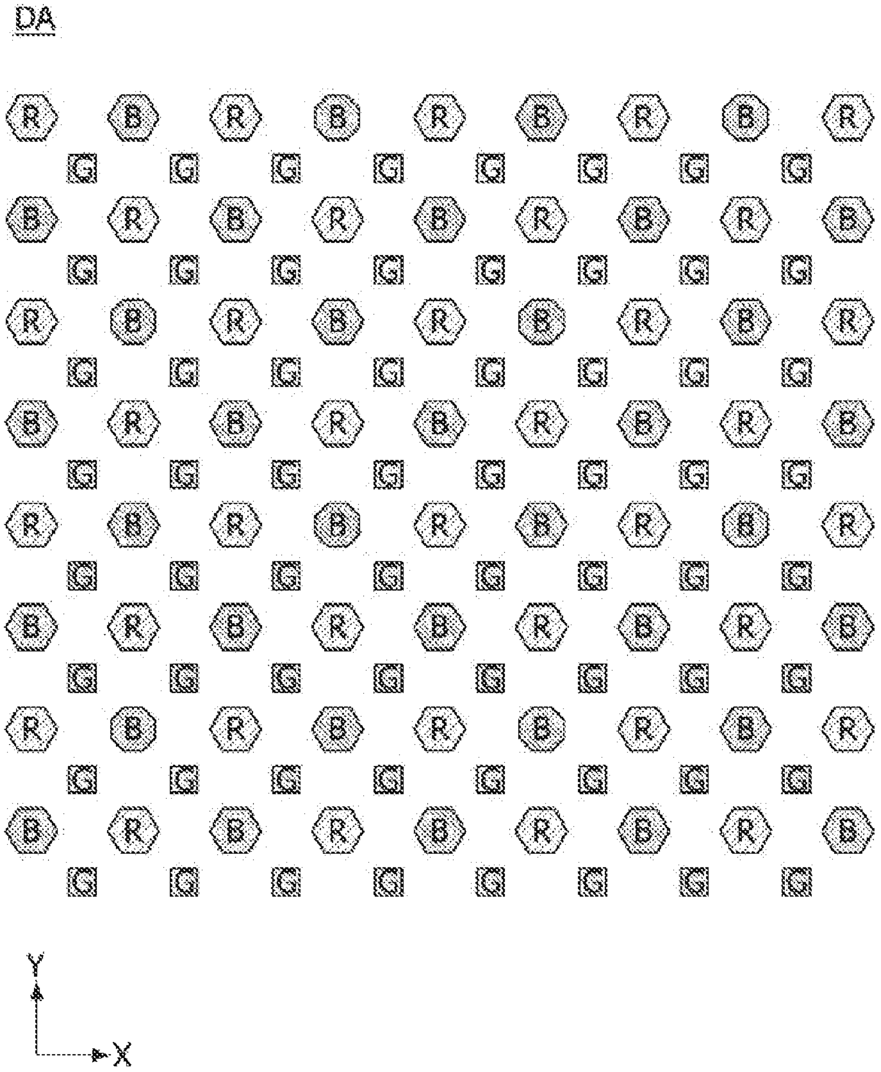
FIG. 3 is a view illustrating pixels in a first pixel region according to an embodiment of the present disclosure.
Figure 4:
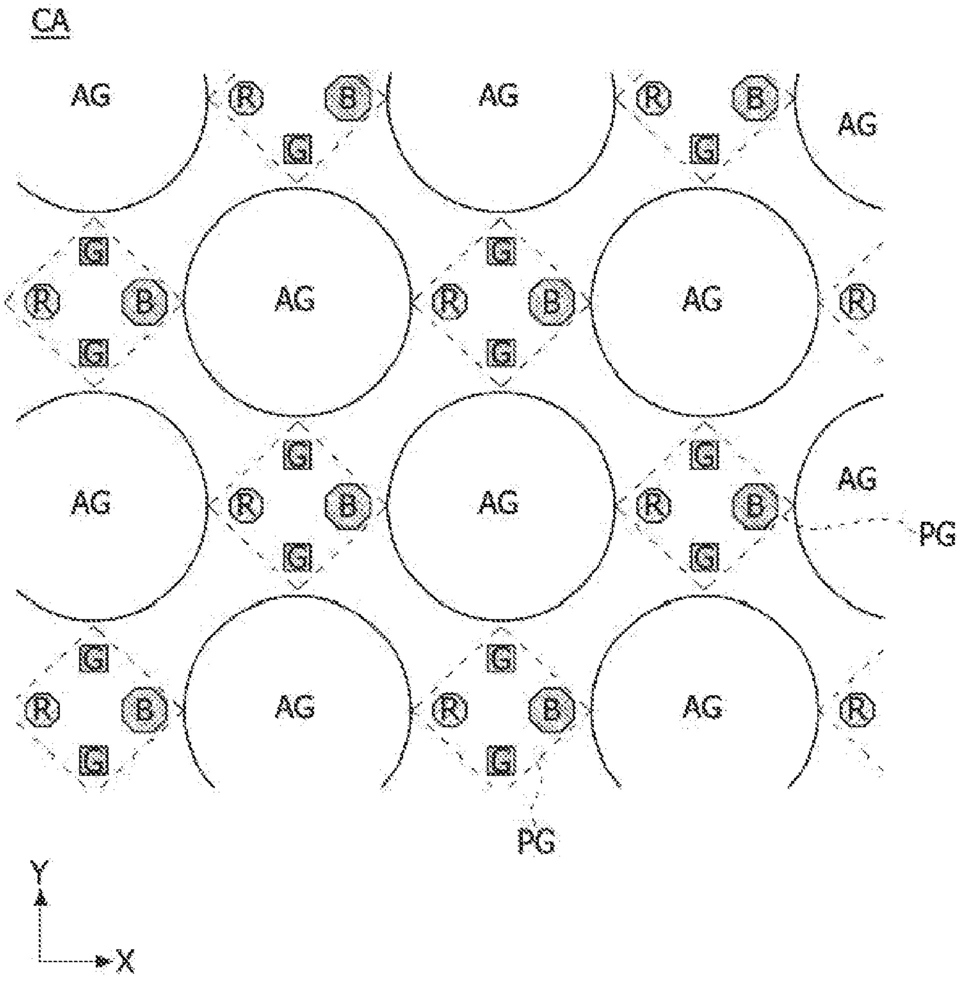
FIG. 4 is a view illustrating pixels in a second pixel region and light-transmitting parts according to an embodiment of the present disclosure.

FIG. 3 is a view illustrating an example of an arrangement of the pixels in the first pixel region DA. FIG. 4 is a view illustrating an example of an arrangement of the pixels in the second pixel region CA and light-transmitting parts AG. In FIGS. 3 and 4, the interconnections connected to the pixels are omitted.

Referring to FIG. 3, each of the pixels in the first pixel region DA can include red, green, and blue (R, G, and B) subpixels or can include subpixels of two colors. Each of the pixels can further include a white (W) subpixel.

The subpixels can have different light-emitting efficiency of the light-emitting elements for each color. In consideration of the above, the subpixels can have different sizes for each color. For example, among the R, G, and B subpixels, the B subpixel can have the largest size and the G subpixel can have the smallest size.

Referring to FIG. 4, the pixels in the second pixel region CA include a plurality of pixel groups PG in which one or two pixels are grouped. The pixel groups PG are spaced a predetermined distance from each other. The light-transmitting parts AG are disposed in a space between the pixel groups PG. The light-transmitting parts AG can include transparent medium having high transmittance and no metal so that light can pass through the second pixel region CA with minimal light loss. In other words, the light-transmitting parts AG can be made of transparent insulating materials having no metal interconnections or pixels.

Each of the pixel groups PG can include one or two pixels or can include three or four R, G, and B subpixels. Furthermore, each of the pixel groups PG can further include one or more W sub-pixels.

A size of the light-transmitting part AG is smaller than that of a light-emitting surface and a light-receiving surface of the optical device 200. For example, a lens of each of the infrared light source 201 and the infrared imaging device 202 can be larger than the light-transmitting part AG.

Figure 5:
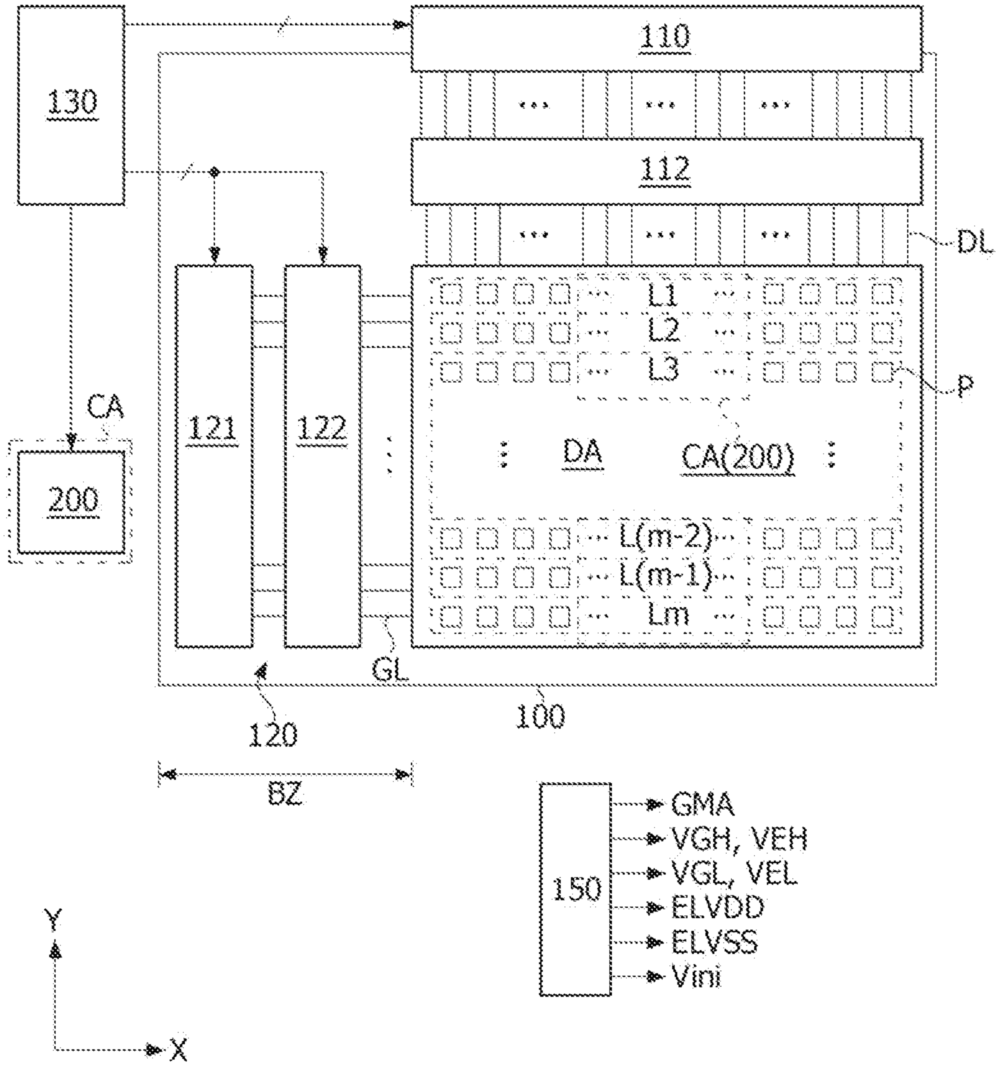
FIG. 5 is a block diagram illustrating a display device according to an embodiment of the present disclosure.

FIG. 5 is a block diagram illustrating a display device according to an embodiment of the present disclosure.

Referring to FIG. 5, the display device according to the embodiment of the present disclosure includes a display panel 100, display panel drivers 110, 112, and 120 for writing pixel data of an input image in pixels P of the display panel 100, a timing controller 130 for controlling the display panel drivers, and a power supply 150 that generates power required to drive the display panel 100.

The display panel 100 includes a pixel array that displays the input image on a screen. As described above, the pixel array can be divided into a first pixel region DA and a second pixel region CA. Most image information can be displayed in the first pixel region DA. Optical devices 200 can be disposed under the display panel 100 to overlap the second pixel region CA.

Touch sensors can be disposed on the screen of the display panel 100. The touch sensors can be disposed on the screen of the display panel in an on-cell type or an add-on type, or can be implemented as in-cell type touch sensors embedded in the pixel array.

The display panel 100 can be implemented as a flexible display panel in which the pixels P are disposed on a flexible substrate, such as a plastic substrate, a metal substrate, or the like. In a flexible display, a size and shape of a screen can be changed by winding, folding, or bending the flexible display panel. The flexible display can include a slidable display, a rollable display, a bendable display, a foldable display, or the like.

The display panel driver displays the input image on the screen of the display panel 100 by writing the pixel data of the input image in the subpixels. The display panel driver includes a data driver 110 and a gate driver 120. The display panel driver can further include a demultiplexer 112 disposed between the data driver 110 and data lines DL.

The display panel driver can be operated in a low-speed driving mode under the control of the timing controller 130. In the low-speed driving mode, the input image can be analyzed, and when the input image is not changed for a preset time, power consumption of the display device can be reduced. In the low-speed driving mode, when a still image is input for a predetermined time or more under the control of the timing controller 130, a refresh rate of the pixels P can be lowered to extend a data writing period of the pixels P to be longer, and thus power consumption can be reduced. The low-speed driving mode is not limited when the still image is input. For example, when the display device is operated in a standby mode or when a user command or an input image is not input to a display panel driving circuit for a predetermined time or more, the display panel driving circuit can be operated in the low-speed driving mode.

The gate driver 120 applies gate signals to gate lines GL under the control of the timing controller 130. The gate driver 120 can supply the gate signals sequentially to the gate lines GL by shifting the gate signals using a shift register. A voltage of the gate signal swings between a gate off voltage and a gate on voltage. The gate signal can include a pulse (hereinafter, referred to as a "scan pulse") of a scan signal and an emission control pulse (hereinafter, referred to as an "EM pulse"). The gate lines can include scan lines to which the scan pulse is applied, and EM lines to which the EM pulse is applied.

The gate driver 120 can be implemented as a gate in panel (GIP) circuit disposed in a bezel region BZ on the display panel 100 together with a thin film transistor (TFT) array of the pixel array. The bezel region BZ is a non-display region disposed on an edge outside pixel arrays DA and CA on the display panel 100. In another embodiment, at least a portion of a circuit constituting the gate driver 120 can be embedded in the pixel array.

The gate driver 120 can be disposed in each of left and right bezel regions BZ of the display panel 100 to supply the gate signals to the gate lines GL in a double feeding method. In the double feeding method, the gate drivers 120 each disposed on both bezels of the display panel 100 can be synchronized by the timing controller 130 so that the gate signals can be simultaneously applied to both ends of one gate line. In another embodiment, the gate driver 120 can be disposed in any one of the left and right bezel regions of the display panel 100 to supply the gate signals to the gate lines GL in a single feeding method.

The gate driver 120 can include a scan driver 121 and an EM driver 122. The scan driver 121 outputs the scan pulse, shifts the scan pulse according to a shift clock, and supplies the scan pulse sequentially to the scan lines. The EM driver 122 outputs the EM pulse, shifts the EM pulse according to the shift clock, and supplies the EM pulse sequentially to the EM lines.

The data driver 110 samples pixel data to be written in the pixels of the pixel array from the pixel data received from the timing controller 130. The data driver 110 receives a gamma reference voltage GMA from the power supply 150. The data driver 110 can divide the gamma reference voltage GMA through a voltage divider circuit to generate a gamma compensation voltage for each gray level. The data driver 110 converts the pixel data to be written in the pixels into the gamma compensation voltage using a digital-to-analog converter (hereinafter, referred to as a "DAC") and outputs a data voltage Vdata. The DAC outputs the gamma compensation voltage selected in response to the gray level of the pixel data.

The data driver 110 outputs the data voltage of the pixel data synchronized with the scan pulse during a scanning period in which the gate signals are applied to the sub-pixels. The subpixels in the second pixel region CA can share the gate lines with the subpixels in the first pixel region DA. In this situation, when the scan pulse is applied to the gate lines connected to the subpixels in the second pixel region CA, the first and second pixel regions DA and CA can be scanned simultaneously.

The demultiplexer 112 divides the data voltage by time and distributes the data voltage Vdata, which is output through channels of the data driver 110, to the plurality of data lines DL. Due to the demultiplexer 112, the number of channels of the data driver 110 can be reduced. The demultiplexer 112 can be omitted.

The timing controller 130 controls the display panel drivers 110, 112, and 120 and the optical devices 200. The timing controller 130 drives an infrared light source 201, an infrared imaging device 202, and a dot projector 203 of the optical device 200 in a facial recognition mode (e.g., see FIG. 2).

The timing controller 130 receives the pixel data of the input image and a timing signal synchronized with the pixel data from a host system. The timing signal includes a vertical synchronization signal Vsync, a horizontal synchronization signal Hsync, a main clock CLK, a data enable signal DE, or the like. One period of the vertical synchronization signal Vsync is one frame period. One period of each of the horizontal synchronization signal Hsync and the data enable signal DE is one horizontal period 1H. A pulse of the data enable signal DE is synchronized with one-line data to be written in the pixels P of one pixel line. Since the frame period and the horizontal period can be known by counting the data enable signal DE, the vertical synchronization signal Vsync and the horizontal synchronization signal Hsync can be omitted. In FIG. 5, reference numerals "L1 to Lm" indicate first to mth pixel lines (here, m is a natural number greater than zero).

The timing controller 130 can control operation timings of the display panel drivers 110, 112, and 120 with an input frame frequency xa frame frequency of i Hz by multiplying the input frame frequency by i (here, i is a natural number). The input frame frequency is 60 Hz in a National Television Standards Committee (NTSC) scheme, and is 50 Hz in a Phase Alternating Line (PAL) scheme. The timing controller 130 can lower the frame frequency to a frequency in a range of 1 Hz to 30 Hz in order to lower the refresh rate of the pixels P in the low-speed driving mode.

The timing controller 130 transmits the pixel data of the input image to the data driver 110 and controls the operation timings of the display panel drivers to synchronize the data driver 110, the demultiplexer 112, and one or more gate drivers 120. The timing controller 130 generates a data timing control signal for controlling the operation timing of the data driver 110, a switch control signal for controlling the operation timing of the demultiplexer 112, and a gate timing control signal for controlling the operation timing of the gate driver 120, based on the timing signals Vsync, Hsync, and DE received from the host system.

A voltage level of the gate timing control signal output from the timing controller 130 can be converted into a gate off voltage VGH/VEH and a gate on voltage VGL/VEL through a level shifter, and the gate off voltage VGH/VEH and the gate on voltage VGL/VEL can be supplied to the gate driver 120. The level shifter can convert a low level voltage of the gate timing control signal into a gate on voltage VGL, and can convert a high level voltage of the gate timing control signal into a gate off voltage VGH. The gate timing control signal output from the level shifter can include a start pulse, a shift clock, or the like.

The power supply 150 can include a charge pump, a regulator, a buck converter, a boost converter, and the like. The power supply 150 receives a direct current (DC) input voltage from the host system and generates DC voltage (or constant voltage) required to drive the display panel drivers and the display panel 100. The power supply 150 can output a gamma reference voltage GMA, a gate off voltage VGH/VEH, a gate on voltage VGL/VEL, and DC voltages such as a pixel driving voltage ELVDD, a low potential power voltage ELVSS, an initialization voltage *Vini*, and the like. The gamma reference voltage GMA is supplied to the data driver 110. The gate off voltage VGH/VEH and the gate on voltage VGL/VEL are supplied to the level shifter and the gate driver 120. The DC voltages such as the pixel driving voltage ELVDD, the low potential power voltage ELVSS, the initialization voltage *Vini*, and the like are commonly supplied to the pixel circuits through the power lines. The pixel driving voltage ELVDD is set to a voltage higher than the low potential power voltage ELVSS and the initialization voltage *Vini*.

The host system can include a main circuit board of a television (TV) system, a personal computer (PC), a set-top box, a vehicle system, a home theater system, a mobile device, and a wearable device. An authentication module of the host system compares facial feature points of the image received from the infrared imaging device 202 of the optical device 200 to preset or pre-stored facial feature points of the user to process the user's facial recognition.

In a mobile device or a wearable device, the timing controller 130, the data driver 110, and the power supply 150 can be integrated into one drive IC (D-IC).

Transistor characteristics of the pixel circuit can be changed or impaired by light emitted from the optical device 200 and, particularly, infrared light (IR). In this situation, a luminance of the pixels that overlap the infrared light source 201 may be changed or impaired. In order to prevent the change or impairment, the timing controller 130 can set an emission permitting section within a non-driving period of the pixels disposed in at least a portion of the second pixel region CA, and can set a driving period of the pixels affected by the infrared light as an emission prohibiting section. For example, the pixels in the second pixel region CA and the optical device 200 can be controlled to operate at different timings, in order to avoid influencing each other's operations. Here, the pixels disposed in at least a portion of the second pixel region CA can include pixels that are radiated with the infrared light from the infrared light source 201 and are under the influence of the infrared light.

The timing controller 130 can modulate shift clocks for controlling the gate driver 120 to set the emission prohibiting section and the emission permitting section.

Each of the subpixels in the first and second pixel regions DA and CA can include a pixel circuit for driving a light-emitting element. The pixel circuits in the first and second pixel regions DA and CA can be the same or different. For example, the pixel circuit in the second pixel region can have a smaller number of transistors than that in the first pixel region.

Due to process variations and element characteristic variations caused in the manufacturing process of the display panel, there can be a difference in electrical characteristics of driving elements between subpixels, and the difference can be further increased as a driving time of the pixels elapses. In order to compensate for variations in the electrical characteristics of the driving elements between the pixels, an internal compensation technique or an external compensation technique can be applied to an organic light-emitting display device.

In the internal compensation technique, an internal compensation circuit implemented in each pixel circuit is used to sense a threshold voltage of a driving element for each subpixel, and a gate-source voltage Vgs of the driving element is compensated with the threshold voltage. In the external compensation technique, an external compensation circuit is used to detect a current or voltage of a driving element in real time, which varies according to electrical characteristics of the driving element. In the external compensation technique, by modulating pixel data (digital data) of an input image by the variation (or change) of the electrical characteristic of the driving element detected for each pixel, the variation (or change) of the electrical characteristic of the driving element is compensated for in real time in each pixel.

Figure 6:
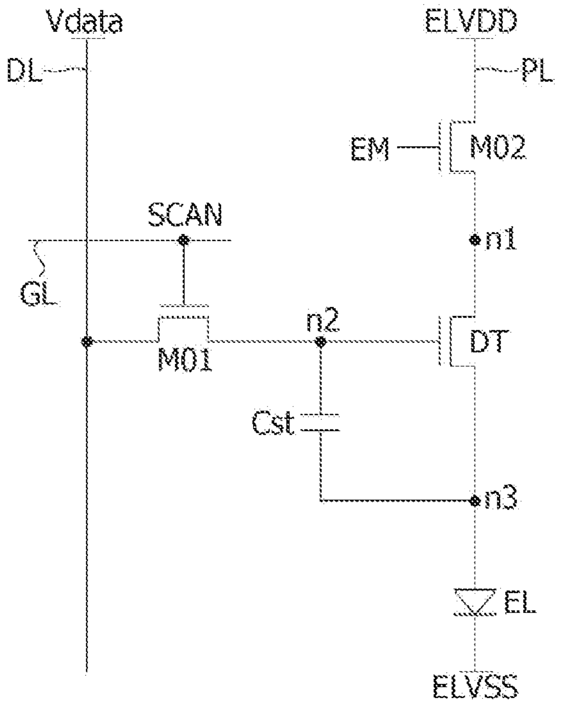
FIGS. 6 to 8 are circuit diagrams illustrating various pixel circuits applicable as a pixel circuit according to embodiments of the present disclosure.
Figure 7:
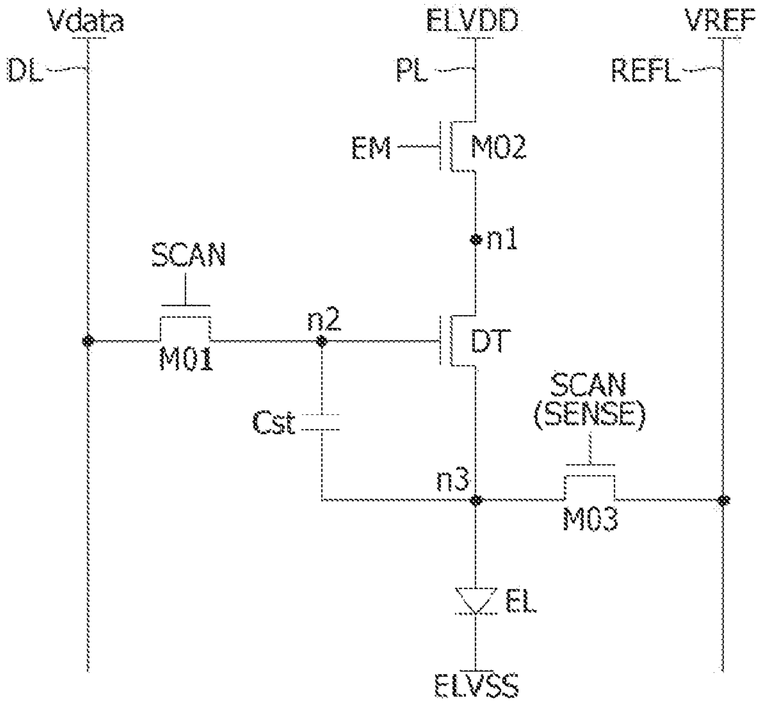
Figure 8:
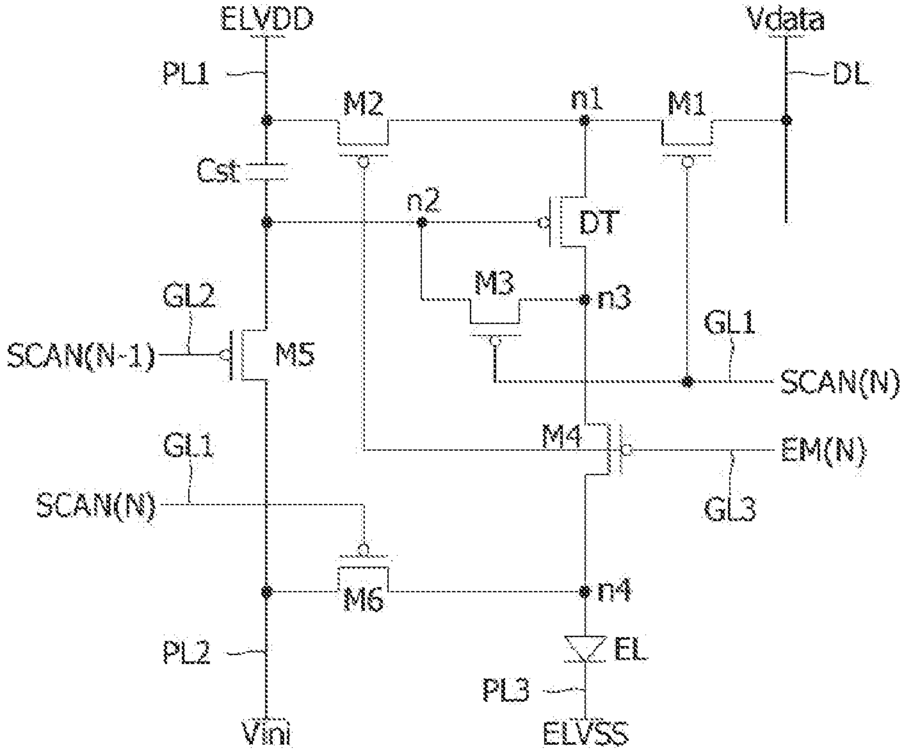

FIGS. 6 to 8 are circuit diagrams illustrating various pixel circuits applicable as the pixel circuits of the present disclosure.

Referring to FIG. 6, the pixel circuits include a light-emitting element EL, a driving element DT that supplies a current to the light-emitting element EL, a first switching element M01 that connects data lines DL in response to a scan pulse SCAN, a second switching element M02 that switches current paths of a pixel driving voltage ELVDD and the light-emitting element EL in response to an EM pulse EM, and a capacitor Cst connected to a gate electrode of the driving element DT. In the pixel circuit, the driving element DT and the switching elements M01 and M02 can be implemented as n-channel transistors.

The first switching element M01 is turned on according to a gate on voltage of the scan pulse SCAN to connect the data line DL to a second node n2. The second switching element M02 is turned on in response to a gate on voltage of the EM pulse EM and supplies the pixel driving voltage ELVDD to a first node n1 to form a current path between the pixel driving voltage ELVDD and the light-emitting element EL. The second switching element M02 can be disposed between and connected to the pixel driving voltage ELVDD and the driving element DT or can be disposed between and connected to the driving element DT and the light-emitting element (OLED). Two second switching elements M02 can be included in the pixel circuit. In this situation, one of the second switching elements can be disposed between and connected to the pixel driving voltage ELVDD and the driving element DT, and the other can be disposed between and connected to the driving element DT and the light-emitting element (OLED).

The driving element DT includes a first electrode connected to the first node n1, a gate electrode connected to the second node n2, and a second electrode connected to a third node n3. The driving element DT supplies a current to the light-emitting element EL according to a gate-source voltage Vgs to drive the light-emitting element EL. When a forward voltage between an anode and a cathode is greater than or equal to a threshold voltage, the light-emitting element EL is turned on and emits light.

The capacitor Cst is disposed between and connected to the second node n2 and the third node n3 and stores the gate-source voltage Vgs of the driving element DT.

Referring to FIG. 7, the pixel circuit can further include a third switching element M03 disposed between and connected to a reference voltage line REFL and the second electrode of the driving element DT. In the pixel circuit, the driving element DT and the switching elements M01, M02, and M03 can be implemented as n-channel transistors.

The third switching element M03 is turned on in response to the gate on voltage of the scan pulse SCAN or a sensing pulse SENSE to connect the reference voltage line REFL, to which a reference voltage Vref is applied, to the third node n3.

In a sensing mode, a current flowing through a channel of the driving element DT or a voltage between the driving element DT and the light-emitting element EL can be detected through the reference line REFL. The current flowing through the reference line REFL is converted into a voltage using an integrator and is converted into digital data using an analog-to-digital converter (hereinafter, referred to as an "ADC"). The digital data is sensing data including the threshold voltage of the driving element DT or mobility information. The sensing data can be transmitted to a compensation unit of the timing controller 130. The compensation unit can receive the sensing data from the ADC and compensate for a deviation or change in the threshold voltage of the driving element DT by adding a compensation value selected based on the sensing data to pixel data or multiplying the compensation value and the pixel data.

Figure 9:
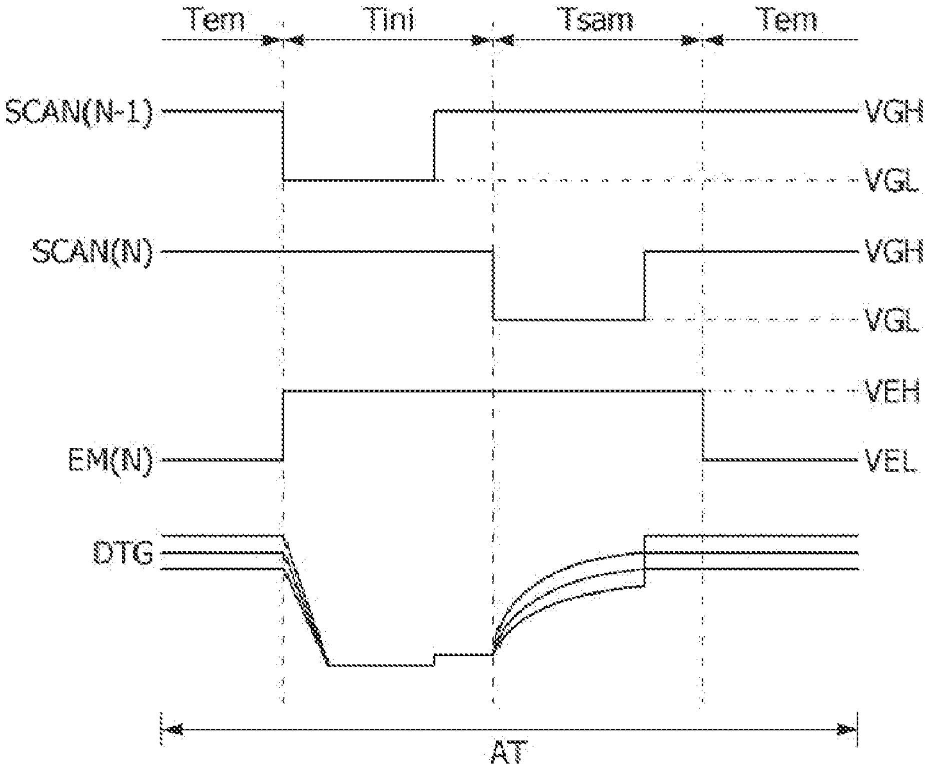
FIG. 9 is a waveform diagram illustrating driving signals applied to the pixel circuit illustrated in FIG. 8 according to an embodiment of the present disclosure.

FIG. 8 is a circuit diagram illustrating an example of a pixel circuit to which an internal compensation circuit is applied. FIG. 9 is a waveform diagram illustrating driving signals applied to the pixel circuit illustrated in FIG. 8.

Referring to FIGS. 8 and 9, the pixel circuit includes a light-emitting element EL, a driving element DT that supplies a current to the light-emitting element EL, and switch circuits that switch voltages applied to the light-emitting element EL and the driving element DT.

The switch circuits are connected to power lines PL1, PL2, and PL3, to which a pixel driving voltage ELVDD, a low potential power voltage ELVSS, and an initialization voltage *Vini* are applied, data lines DL, and gate lines GL1, GL2, and GL3. The switch circuits switch voltages applied to the light-emitting element EL and the driving element DT in response to scan pulses SCAN(N−1) and SCAN(N) and an EM pulse EM(N).

The switch circuit samples a threshold voltage Vth of the driving element DT using a plurality of switching elements M1 to M6 to store the sampled threshold voltage Vth of the driving element DT in a capacitor Cst, and compensates a gate voltage DTG of the driving element DT with the threshold voltage Vth of the driving element DT. Each of the driving element DT and the switching elements M1 to M6 can be implemented as a p-channel transistor.

A driving period of the pixel circuit can be divided into an initialization period Tini, a sampling period Tsam, and an emission period Tem, as illustrated in FIG. 9.

An Nth scan pulse SCAN(N) is generated as a gate on voltage VGL in the sampling period Tsam and applied to a first gate line GL1. An (N−1)th scan pulse SCAN(N−1) is generated prior to the Nth scan pulse SCAN(N) and applied to a second gate line GL2. The initialization period Tini is defined by the (N−1)th scan pulse SCAN(N−1). The EM pulse EM(N) is generated as a gate off voltage VEH in the initialization period Tini and the sampling period Tsam and applied to a third gate line GL3.

During the initialization period Tini, the (N−1)th scan pulse SCAN(N−1) is generated as a gate on voltage VGL and applied to the second gate line GL2. During the initialization period Tini, voltages of the first and third gate lines GL1 and GL3 are gate off voltages VGH and VEH.

During the sampling period Tsam, the Nth scan pulse SCAN(N) is generated as a pulse of the gate on voltage VGL and applied to the first gate line GL1. During the sampling period Tsam, voltages of the second and third gate lines GL2 and GL3 are gate off voltages VGH.

During at least one section of the emission period Tem, the EM pulse EM(N) is generated as a gate on voltage VEL and applied to the third gate line GL3. During the emission period Tem, the voltages of the first and second gate lines GL1 and GL2 are the gate off voltage VGH.

An anode of the light-emitting element EL is connected to a fourth node n4 disposed between fourth and sixth switching elements M4 and M6. The fourth node n4 is connected to the anode of the light-emitting element EL, a second electrode of a fourth switching element M4, and a second electrode of a sixth switching element M6. A cathode of the light-emitting element EL is connected to a VSS line PL3 to which the low potential power voltage ELVSS is applied. The light-emitting element EL emits light with a current flowing according to a gate-source voltage Vgs of the driving element DT. A current path of the light-emitting element EL is switched by the second and fourth switching elements M2 and M4.

The capacitor Cst is disposed between and connected to a VDD line PL1 and a second node n2. The capacitor Cst includes a first electrode connected to the VDD line PL1, and a second electrode connected to the second node n2. Data voltage Vdata compensated with a threshold voltage Vth of the driving element DT is charged in the capacitor Cst. Since data voltage Vdata is compensated with the threshold voltage Vth of the driving element DT in each subpixel, the subpixels are compensated for a variation (or change) of the characteristics of the driving element DT.

The first switching element M1 is turned on in response to the gate on voltage VGL of the Nth scan pulse SCAN(N) to supply the data voltage Vdata to the first node n1. A gate electrode of the first switching element M1 is connected to the first gate line GL1 to receive the Nth scan pulse SCAN(N). A first electrode of the first switching element M1 is connected to the first node n1. A second electrode of the first switching element M1 is connected to the data line DL to which the data voltage Vdata is applied. The first node n1 is connected to the first electrode of the first switching element M1, a second electrode of the second switching element M2, and the first electrode of the driving element DT.

The second switching element M2 is turned on in response to the gate on voltage VEL of the EM pulse EM(N) to connect a VDD line PL1 to the first node n1. A gate electrode of the second switching element M2 is connected to a third gate line GL3 to receive the EM pulse EM(N). A first electrode of the second switching element M2 is connected to the VDD line PL1. The second electrode of the second switching element M2 is connected to the first node n1.

The third switching element M3 is turned on in response to the gate on voltage VGL of the Nth scan pulse SCAN(N) to connect the second node n2 to the third node n3. The second node n2 is connected to the gate electrode of the driving element DT, the second electrode of the capacitor Cst, and the first electrode of the third switching element M3. The third node n3 is connected to the second electrode of the driving element DT, the second electrode of the third switching element M3, and a first electrode of a fourth switching element M4. The gate electrode of the third switching element M3 is connected to the first gate line GL1 to receive the Nth scan pulse SCAN(N). The first electrode of the third switching element M3 is connected to the second node n2, and the second electrode of the third switching element M3 is connected to the third node n3.

Since the third switching element M3 is turned on during one very short horizontal period 1H, in which the Nth scan pulse SCAN(N) is generated as the gate on voltage VGL in one frame period, a leakage current can be generated in an off state. In order to suppress the leakage current of the third switching element M3, the third switching element M3 can be implemented as a transistor having a dual gate structure in which two transistors are connected in series.

The fourth switching element M4 is turned on in response to the gate on voltage VEL of the EM pulse EM(N) to connect the third node n3 to the fourth node n4. A gate electrode of the fourth switching element M4 is connected to the third gate line GL3 to receive the EM pulse EM(N). The first electrode of the fourth switching element M4 is connected to the third node n3, and a second electrode of the fourth switching element M4 is connected to the fourth node n4.

A fifth switching element M5 is turned on in response to a gate on voltage VGL of the (N−1)th scan pulse SCAN (N−1) to connect the second node n2 to a *Vini* line PL2. A gate electrode of the fifth switching element M5 is connected to the second gate line GL2 to receive the (N−1)th scan pulse SCAN(N−1). A first electrode of the fifth switching element M5 is connected to the second node n2, and a second electrode is connected to a *Vini* line PL2. In order to suppress a leakage current of the fifth switching element M5, the fifth switching element M5 can be implemented as a transistor having a dual gate structure in which two transistors are connected in series.

The sixth switching element M6 is turned on in response to the gate on voltage VGL of the Nth scan pulse SCAN(N) to connect the *Vini* line PL2 to the fourth node n4. A gate electrode of the sixth switching element M6 is connected to the first gate line GL1 to receive the Nth scan pulse SCAN(N). A first electrode of the sixth switching element M6 is connected to the *Vini* line PL2, and the second electrode is connected to the fourth node n4.

In another embodiment, the gate electrodes of the fifth and sixth switching elements M5 and M6 can be commonly connected to the second gate line GL2 to which the (N−1)th scan pulse SCAN(N−1) is applied. In this situation, the fifth and sixth switching elements M5 and M6 can be simultaneously turned on in response to the (N−1)th scan pulse SCAN(N−1) in the initialization period Tini.

The driving element DT adjusts a current flowing through the light-emitting element EL according to the gate-source voltage Vgs to drive the light-emitting element EL. The driving element DT includes the gate electrode connected to the second node n2, the first electrode connected to the first node n1, and the second electrode connected to the third node n3.

During the initialization period Tini, the $(N-1)^{th}$ scan pulse SCAN(N−1) is generated as the gate on voltage VGL. The $N^{th}$ scan pulse SCAN(N) and the EM pulse EM(N) maintain the gate off voltages VGH and VEH during the initialization period Tini. Therefore, during the initialization period Tini, the fifth switching element M5 is turned on and the second node n2 is initialized to the initialization voltage *Vini*. When the fifth and sixth switching elements M5 and M6 are turned on during the initialization period Tini, the second and fourth nodes n2 and n4 are initialized to the initialization voltage *Vini*.

A holding period can be set between the initialization period Tini and the sampling period Tsam and between the sampling period Tsam and the emission period Tem. In the holding period, the scan pulses SCAN(N−1) and SCAN(N) and the EM pulse EM(N) are the gate off voltages VGH, and the main nodes n1 to n4 of the pixel circuit are floated.

During the sampling period Tsam, the $N^{th}$ scan pulse SCAN(N) is generated as the gate on voltage VGL. A pulse of the $N^{th}$ scan pulse SCAN(N) is synchronized with the data voltage Vdata of the pixel data to be written in the subpixels of the $N^{th}$ pixel line. The $(N-1)^{t}$ scan pulse SCAN(N−1) and the EM pulse EM(N) are the gate off voltages VGH and VEH during the sampling period Tsam. Therefore, during the sampling period Tsam, the first and third switching elements M1 and M3 are turned on. In this situation, the sixth switching element M6 is also turned on to supply the initialization voltage *Vini* to the fourth node n4, and thus light emission of the light-emitting element EL is prevented.

During the sampling period Tsam, the gate voltage DTG of the driving element DT is increased by the current flowing through the first and third switching elements M1 and M3. In the sampling period Tsam, the threshold voltage Vth of the driving element DT is sampled by the capacitor Cst.

During the emission period Tem, the EM pulse EM(N) can be generated as the gate on voltage VGL. During the emission period Tem, the voltage of the EM pulse EM(N) can be inverted with a predetermined duty ratio. Therefore, the EM pulse EM(N) can be generated as the gate on voltage VGL during at least a portion of the emission period Tem.

When the EM pulse EM(N) is the gate on voltage VGL, a current flows between the pixel driving voltage ELVDD and the light-emitting element EL, and thus the light-emitting element EL can emit light. During the emission period Tem, the $(N-1)^{th}$ and $N^{th}$ scan pulses SCAN(N−1) and SCAN(N) are the gate off voltages VGH. During the emission period Tem, the second and fourth switching elements M2 and M4 are turned on in response to the gate on voltage VEL of the EM pulse EM. When the EM pulse EM(N) is the gate on voltage VEL, the second and fourth switching elements M2 and M4 are turned on and the current flows through the light-emitting element EL. During the emission period Tem, the current flowing through the light-emitting element EL is $K(ELVDD-Vdata)^2$. K denotes a constant value determined by charge mobility, parasitic capacitance, and channel capacitance of the driving element DT.

Figure 10:
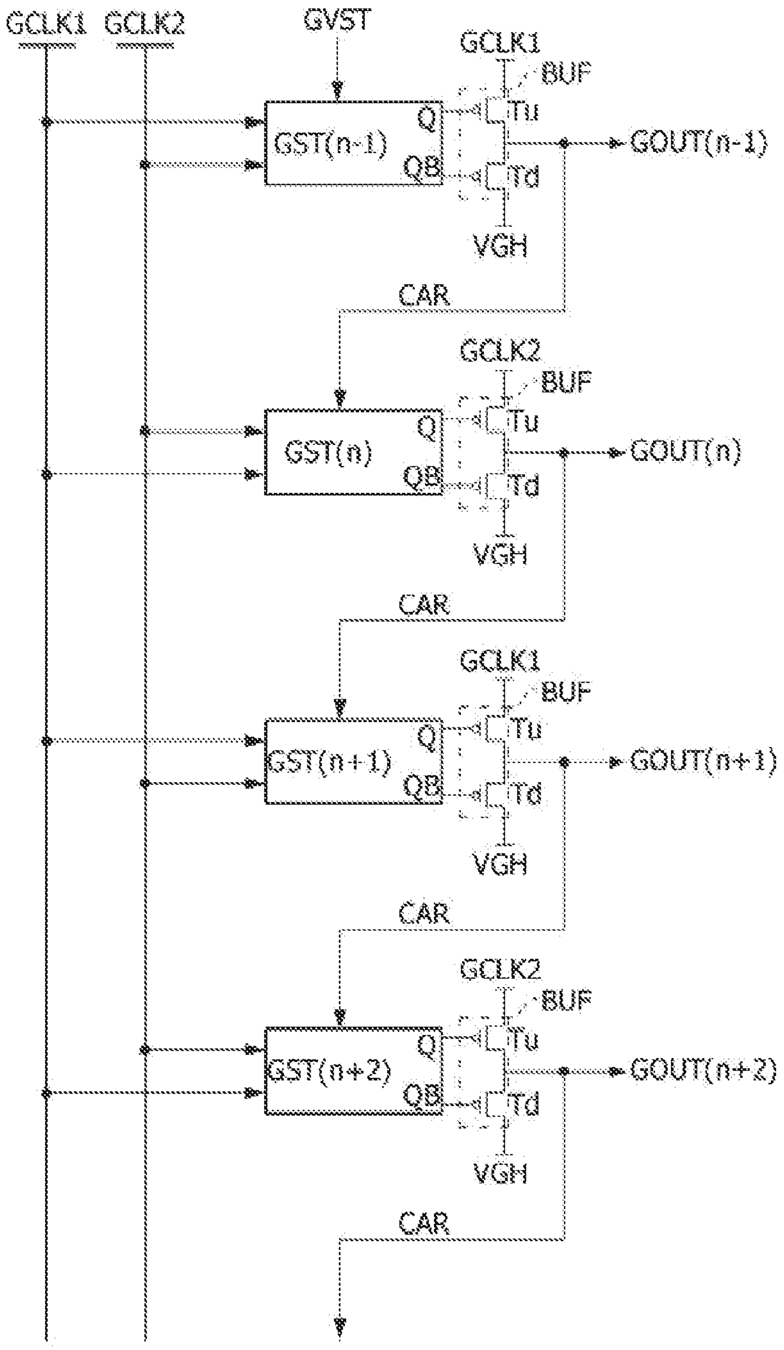
FIG. 10 is a schematic block diagram illustrating a scan driver according to an embodiment of the present disclosure.
Figure 11:
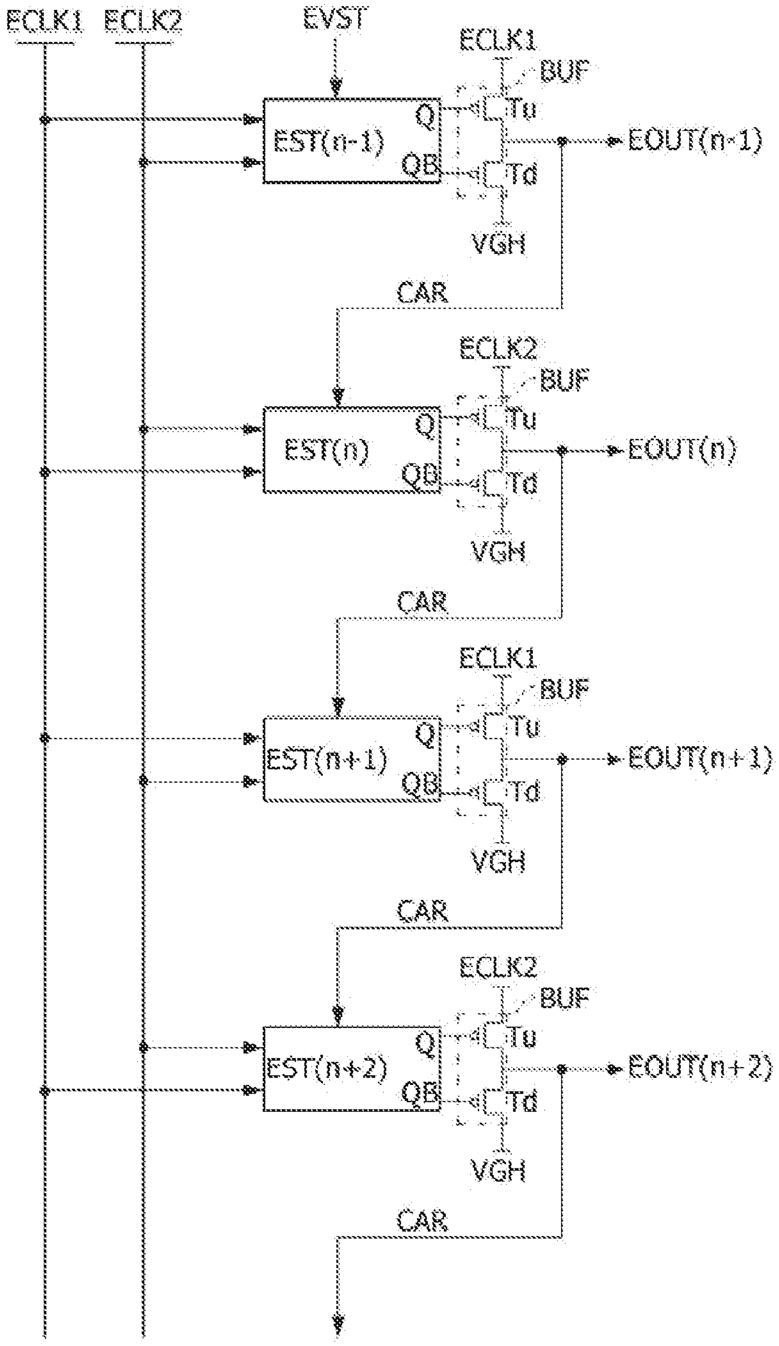
FIG. 11 is a schematic block diagram illustrating an EM driver according to an embodiment of the present disclosure.

FIG. 10 is a schematic block diagram illustrating a scan driver 121 according to an embodiment of the present disclosure. FIG. 11 is a schematic block diagram illustrating an EM driver 122 according to an embodiment of the present disclosure. It should be noted that the scan driver 121 and the EM driver 122 are not limited to circuits illustrated in FIGS. 10 and 11. For example, in FIGS. 10 and 11, although shift clocks input to a shift register are illustrated as first and second clocks that have opposite phases, the shift clocks can be N phase clocks (N is a natural number greater than or equal to 2) in which phases are sequentially shifted. Shift clocks input to signal transmitting units can be changed.

Referring to FIG. 10, the scan driver 121 includes a shift register that receives a start pulse GVST and shift clocks GCLK1 and GCLK2 and sequentially shifts scan pulses GOUT(n−1) to GOUT(n+2) according to the shift clocks GCLK1 and GCLK2.

The shift register of the scan driver 121 includes signal transmitting units GST(n−1) to GST(n+2) which are dependently connected. Each of the signal transmitting units GST(n−1) to GST(n+2) includes a SET node to which the start pulse GVST or a carry signal CAR is input, a GCLK node to which the shift clocks GCLK1 and GCLK2 are input, and an output node to which scan pulses GOUT(n−1) to GOUT(n+2) are output. The start pulse GVST is generally input to a first signal transmitting unit of the shift register. The shift clocks GCLK1 to GCLK4 can be two-phase clocks in FIG. 10, but the present disclosure is not limited thereto.

In the example of FIG. 10, an (n−1)th signal transmitting unit GST(n−1) can be a first signal transmitting unit. Signal transmitting units GST(n) to GST(n+2) dependently connected to the (n−1)th signal transmitting unit GST(n−1) receive the carry signal CAR from the previous signal transmitting unit and start to be driven. The carry signal CAR can be the scan pulses GOUT(n−1) to GOUT(n+2) output from the previous signal transmitting unit. Each of the signal transmitting units GST(n−1) to GST(n+2) can output the carry signal CAR through a separate carry signal output node. The carry signal CAR is output simultaneously with the scan pulses GOUT(n−1) to GOUT(n+2) output from the previous signal transmitting unit.

Each of the signal transmitting units GST(n−1) to GST (n+2) includes a first control node Q, a second control node QB, and a buffer BUF. The buffer BUF outputs gate signals to gate lines through the output node through a pull-up transistor Tu and a pull-down transistor Td.

The pull-up transistor Tu supplies a gate on voltage VGL of the shift clocks GCLK1 and GCLK2 to the output node when a voltage of the first control node Q is charged to a voltage greater than or equal to the gate on voltage. In this situation, the scan pulses GOUT(n−1) to GOUT(n+2) and the carry signal CAR rise to the gate on voltage VGL.

A voltage of the second control node QB is set to a gate off voltage VGH when the first control node Q is charged to a voltage greater than or equal to the gate on voltage. The pull-down transistor Td is turned on and connects the output node to the gate off voltage VGH when the voltage of the second control node QB is charged to the gate on voltage VGL. In this situation, the scan pulses GOUT(n−1) to GOUT(n+2) and the carry signal CAR are changed to the gate off voltage VGH.

Referring to FIG. 11, the EM driver 122 includes a shift register that receives a start pulse EVST and shift clocks ECLK1 and ECLK2 and sequentially shifts EM pulses EOUT(n−1) to EOUT(n+2) according to the shift clocks ECLK1 and ECLK2.

The shift register of the EM driver 122 includes signal transmitting units EST(n−1) to EST(n+2) which are dependently connected. Each of the signal transmitting units EST (n−1) to EST(n+2) includes a SET node to which the start pulse EVST or the carry signal CAR is input, an ECLK node to which the shift clocks ECLK1 and ECLK2 are input, and an output node to which EM pulses EOUT(n−1) to EOUT (n+2) are output. The start pulse EVST is generally input to the first signal transmitting unit of the shift register. The shift clocks ECLK1 to ECLK4 can be two-phase clocks in FIG. 11, but the present disclosure is not limited thereto.

In the example of FIG. 11, an (n−1)th signal transmitting unit EST(n−1) can be a first signal transmitting unit. Signal transmitting units EST(n) to EST(n+2) dependently connected to the (n−1)th signal transmitting unit EST(n−1) receive the carry signal CAR from the previous signal transmitting unit and start to be driven. The carry signal CAR can be EM pulses EOUT(n−1) to EOUT(n+2) output from the previous signal transmitting unit. Each of the signal transmitting units EST(n−1) to EST(n+2) can output the carry signal CAR through a separate carry signal output node. The carry signal CAR is simultaneously output with the EM pulses EOUT(n−1) to EOUT(n+2) output from the previous signal transmitting unit.

Each of the signal transmitting units EST(n−1) to EST (n+2) includes a first control node Q, a second control node QB, and a buffer BUF. The buffer BUF outputs gate signals to the gate lines through the output node through a pull-up transistor Tu and a pull-down transistor Td.

The pull-up transistor Tu supplies a gate on voltage VEL of the shift clocks ECLK1 and ECLK2 to the output node when a voltage of the first control node Q is charged to a voltage greater than or equal to the gate on voltage. In this situation, the EM pulses EOUT(n−1) to EOUT(n+2) and the carry signal CAR rise to the gate on voltage VEL.

A voltage of the second control node QB is set to a gate off voltage VEH when the first control node Q is charged to a voltage greater than or equal to the gate on voltage. The pull-down transistor Td is turned on and connects the output node to the gate off voltage VEH when the voltage of the second control node QB is charged to the gate on voltage VGL. In this situation, the EM pulses EOUT(n−1) to EOUT (n+2) and the carry signal CAR are changed to the gate off voltage VGH.

Figure 12:
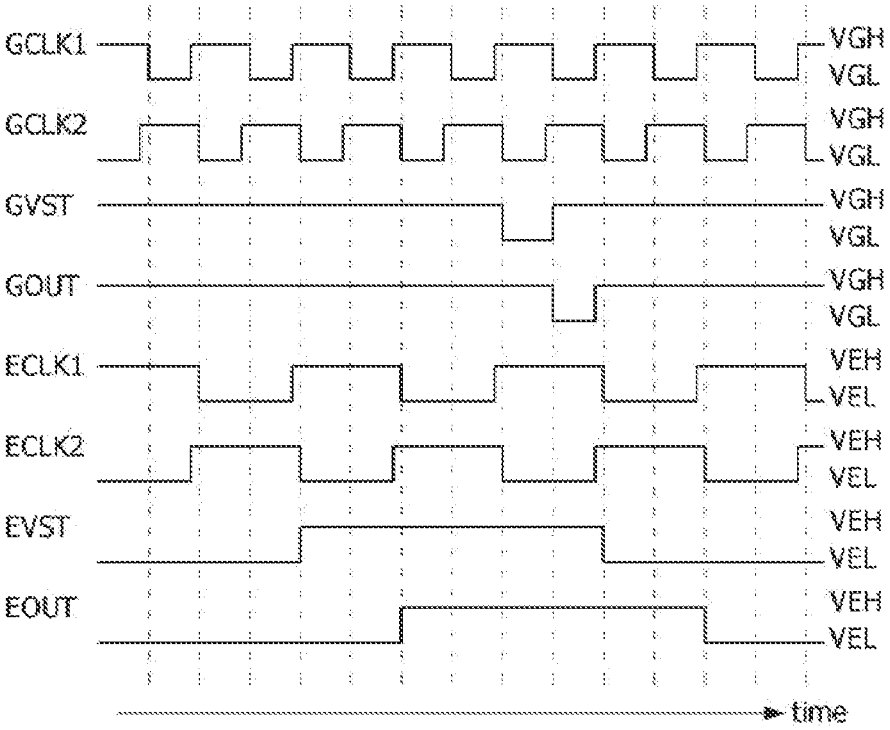
FIGS. 12 and 13 are waveform diagrams illustrating examples of start pulses and shift clocks which are input to the scan driver and the EM driver according to embodiments of the present disclosure.
Figure 13:
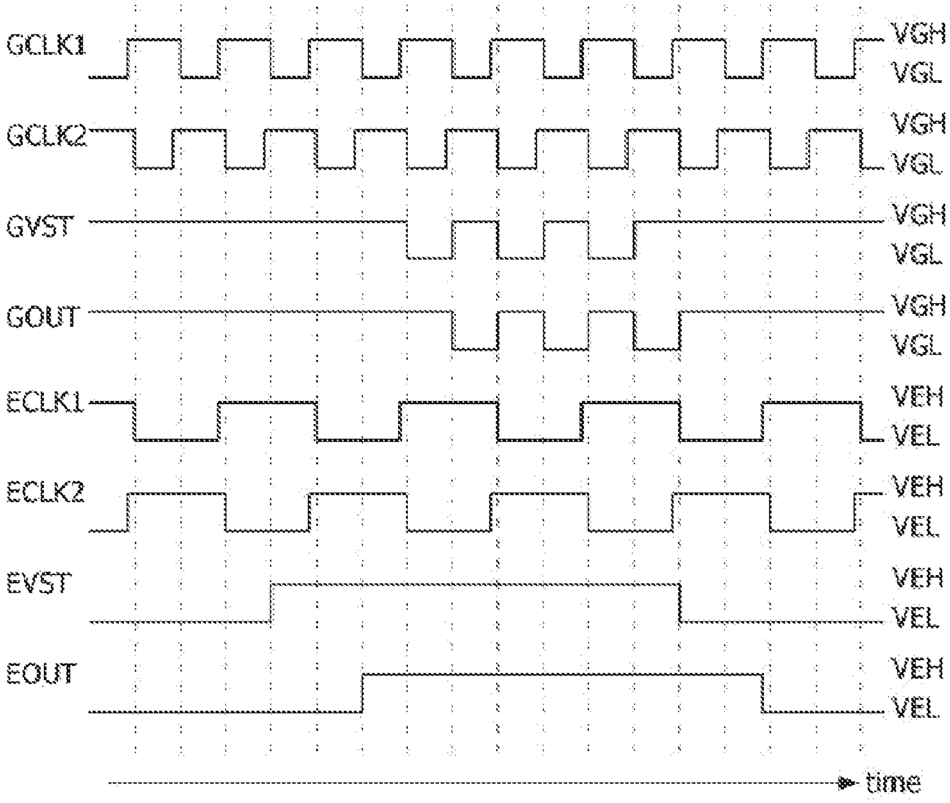

The timing controller 130 can generate start pulses GVST and EVST and shift clocks GCLK1, GCLK2, ECLK1, and ECLK2 as illustrated in FIGS. 12 and 13 to drive the scan driver 121 and the EM driver 122. The start pulses GVST and EVST can be generated as a single pulse as illustrated in FIG. 12 or as a multi pulse as illustrated in FIG. 13. The multi start pulse as illustrated in FIG. 13 can have the improved response characteristic of the light-emitting element EL compared to the single start pulse.

Voltage levels of the start pulses GVST and EVST and the shift clocks GCLK1, GCLK2, ECLK1, and ECLK2 output from the timing controller 130 can be converted through the level shifter and can be applied to the scan driver 121 and the EM driver 122. Rising times, pulse widths, and falling times of the scan pulse and the EM pulse can be adjusted by the start pulses GVST and EVST and the shift clocks GCLK1, GCLK2, ECLK1, and ECLK2. In the examples of FIGS. 12 and 13, pulse periods and pulse widths of the start pulse EVST and the shift clocks ECLK1 and ECLK2 input to the EM driver 122 can be set to be greater than those of the start pulse GVST and the shift clocks GCLK1 and GCLK2 input to the scan driver 121. In this situation, the pulse width of the EM pulse EOUT is greater than that of the scan pulse GOUT.

The timing controller 130 can set an emission prohibiting section and an emission permitting section in order to prevent a change in luminance of pixels or interference due to infrared (IR) light emitted from the infrared light source 201 disposed in the second pixel region CA. The emission permitting section can be set as a section in which scanning is temporarily stopped in the second pixel region CA in which the infrared light source 201 is positioned and the EM pulse is a gate off voltage. The scan pulse is not generated in the emission permitting section. For this reason, even when the infrared light source 201 is driven in the emission permitting section and the infrared light is radiated to the pixel circuit so that the electrical characteristics of the transistor are affected by the infrared light, the data voltage charged in the pixel circuit is not changed, the EM pulse is maintained at the gate off voltage, the current path connected to the light-emitting element is blocked, and thus the luminance of the pixels is not changed and the user does not notice any degradation in image quality because such effects are prevented due to the driving timings.

Figure 14:
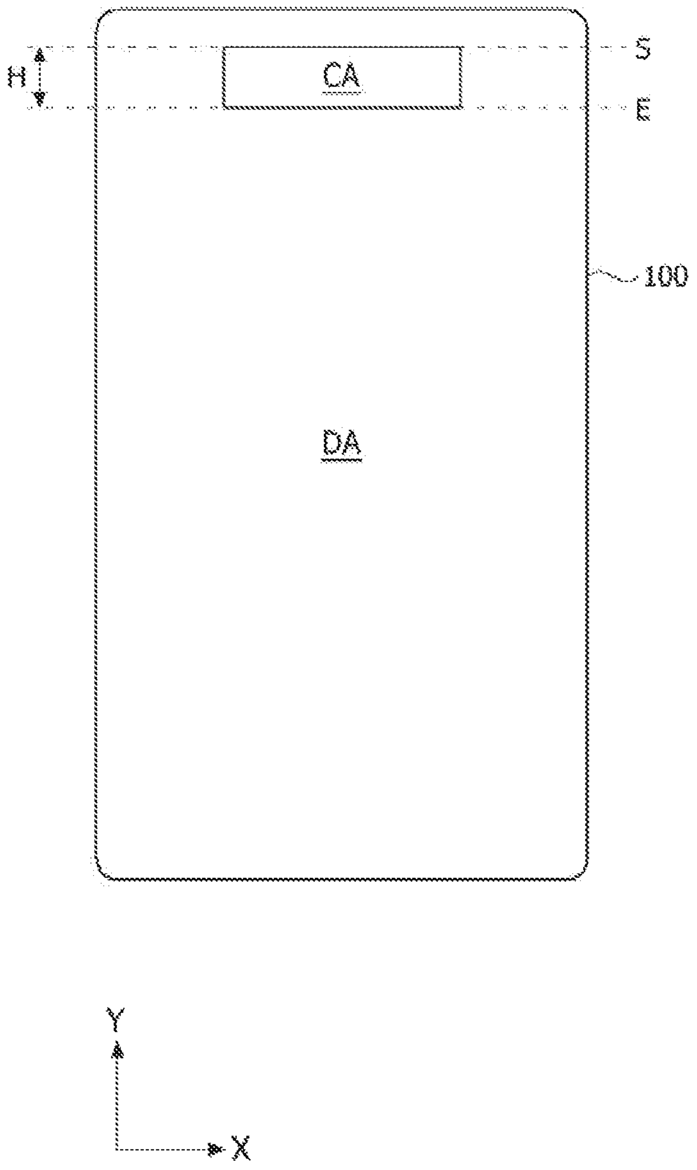
FIG. 14 is a view illustrating a start pixel line, an end pixel line, and a height of a second pixel region according to an embodiment of the present disclosure.
Figure 15:
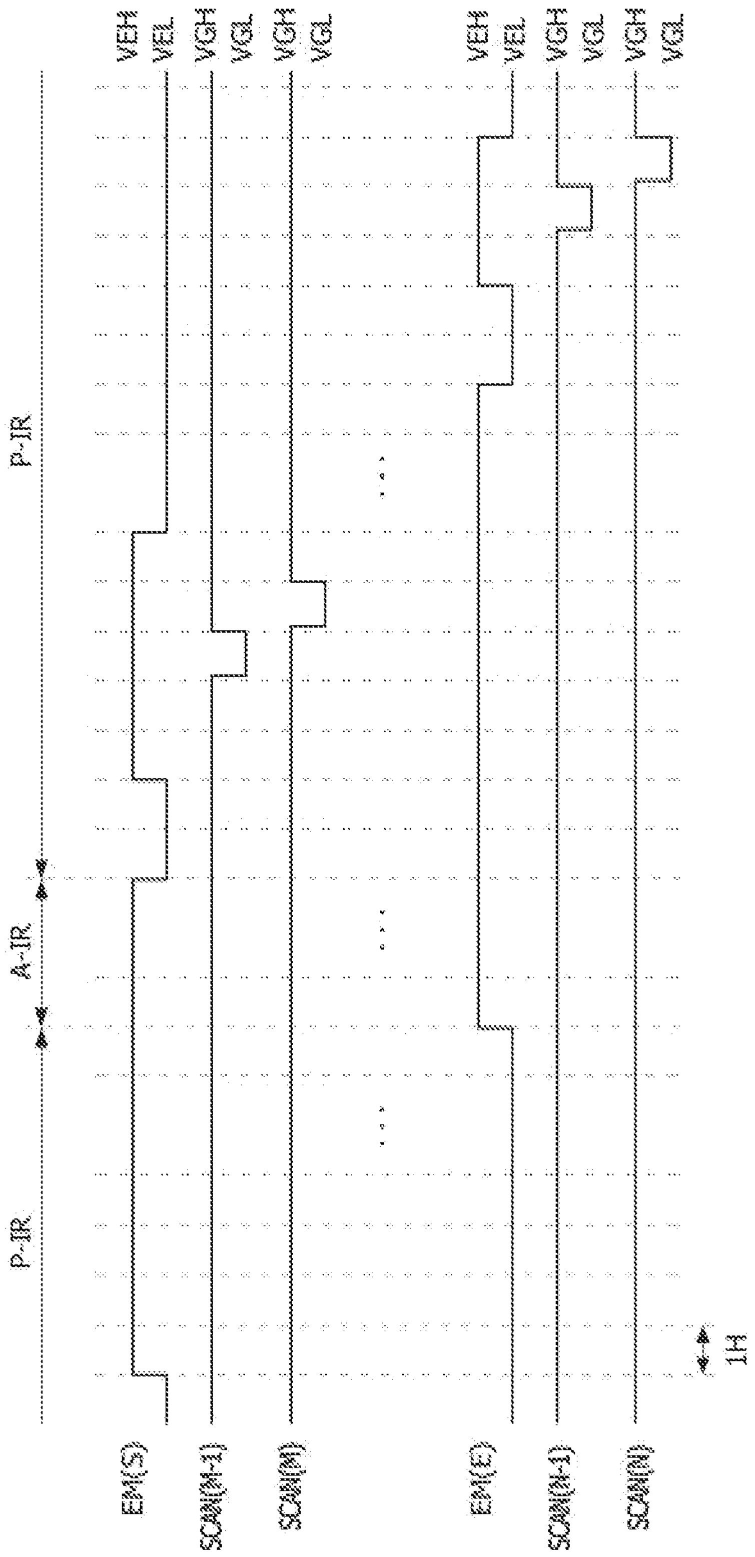
FIG. 15 is a waveform diagram illustrating gate signals in an emission prohibiting section and an emission permitting section according to an embodiment of the present disclosure.
Figure 16:
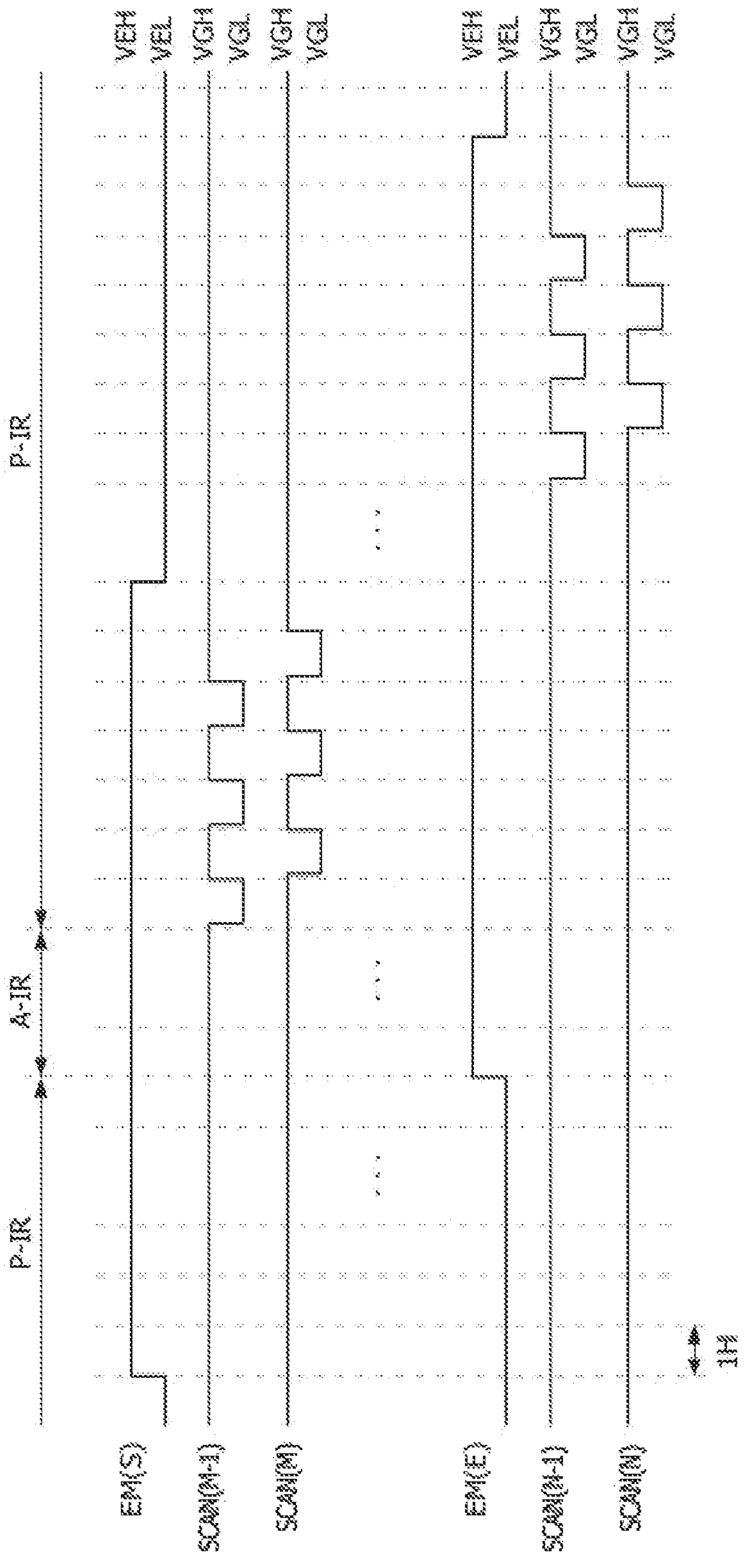
FIG. 16 is a waveform diagram illustrating gate signals in the emission prohibiting section and the emission permitting section according to another embodiment of the present disclosure.

FIGS. 14 to 16 are diagrams for describing an emission prohibiting section P-IR and an emission permitting section A-IR. In FIG. 14, reference numeral “S” indicates a start pixel line positioned at an upper end of the second pixel region CA, and reference numeral “E” indicates an end pixel line positioned at a lower end of the second pixel region CA. A height H of the second pixel region CA corresponds to a distance between the start pixel line S and the end pixel line E.

FIGS. 15 and 16 are waveform diagrams illustrating gate signals in the emission prohibiting section and the emission permitting section. FIG. 15 illustrates an example in which start pulses GVST and EVST are generated in the form of a single pulse, and FIG. 16 illustrates an example in which start pulses GVST and EVST are generated in the form of a multi pulse. In FIGS. 15 and 16, reference numeral “EM(S)” indicates an EM pulse applied to subpixels of a start pixel line S, and reference numeral “EM(E)” indicates an EM pulse applied to subpixels of an end pixel line E. The EM pulses EM(S) to EM(E) are sequentially shifted by the EM driver 122. Reference numerals “SCAN(M-1) to SCAN(N)” indicate scan pulses that are sequentially shifted by the shift register of the scan driver 121 between the start pixel line S and the end pixel line E.

Referring to FIGS. 15 and 16, during the emission prohibiting section P-IR, scan pulses SCAN(M-1) to SCAN(N) can be generated, and a voltage of a gate line GL3 to which EM pulses EM(S) to EM(E) are applied can be a gate on voltage VEL in at least some sections.

During the emission permitting section A-IR, the scan pulses SCAN(M-1) to SCAN(N) are not generated, and the gate lines GL1 and GL2, to which the scan pulses SCAN (M-1) to SCAN(N) are applied, maintain the gate off voltage. In addition, during the emission permitting section A-IR, the EM pulses EM(S) to EM(E) maintain the gate off voltage VEH.

The emission permitting section A-IR can be set before the second pixel region CA is scanned. Since a voltage charged in a capacitor Cst is changed by changing a leakage current of the switching elements by the infrared light, a phenomenon in which the light-emitting element EL emits light due to a change in the voltage of the capacitor Cst can be prevented by driving the infrared light source 201 before the second pixel region CA is scanned. An initialization and sampling operation can be performed in the pixel circuit by entering the emission prohibiting section P-IR after the infrared light source is turned off. In an initialization period, the capacitor Cst is initialized, and the pixels do not emit light. Therefore, even when the voltage of the capacitor of the pixel circuit is changed due to the infrared light, a phenomenon in which a change in luminance of the pixels is visually recognized can be prevented because the pixels in this area are controlled to be off during this time, in order to allow sufficient time for the infrared light source 201 to operate (e.g., for performing a biometric authentication function). For example, the pixels in the second pixel region CA and the infrared light source 201 can take turns in order to not interfere with each other. For example, any change in capacitance in the capacitor Cst due light emitted by the infrared light source 201 will not matter, since the corresponding subpixel is controlled to be in the off state.

Figure 17:
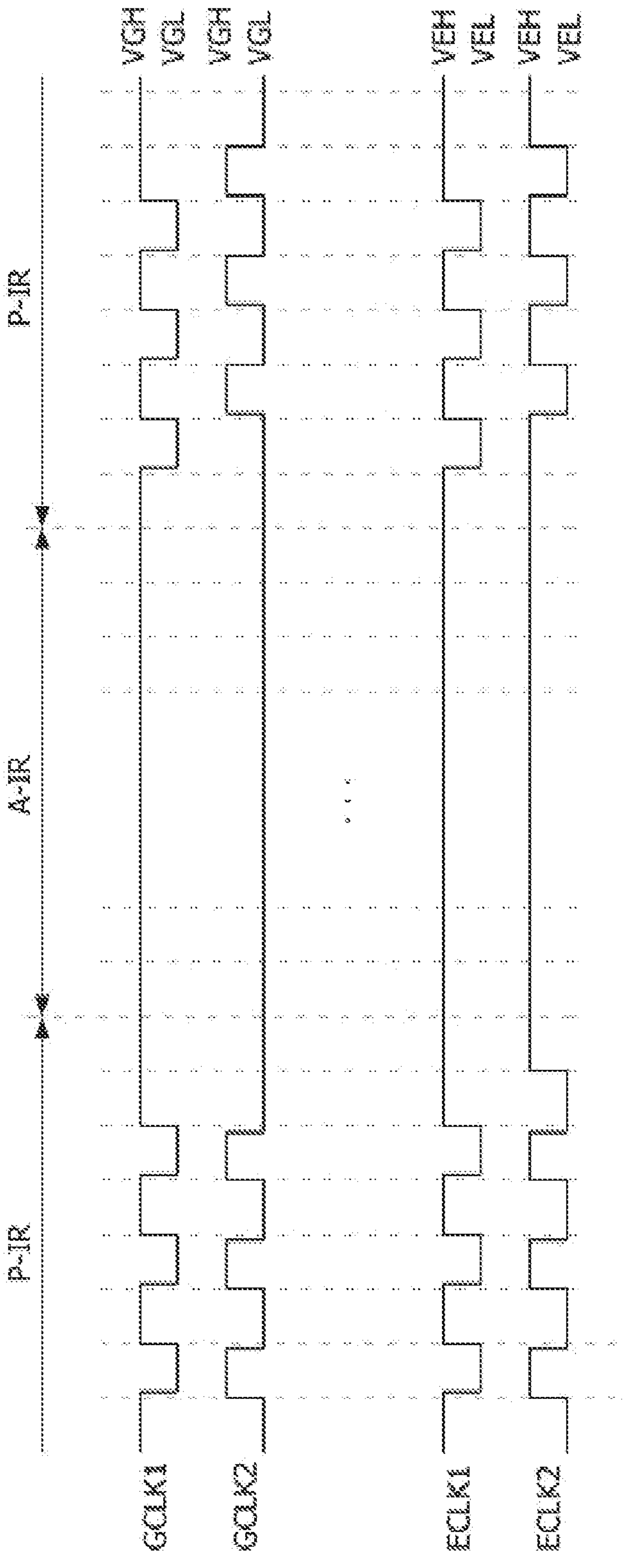
FIG. 17 is a waveform diagram illustrating an example in which shift clocks are modulated in the emission prohibiting section and the emission permitting section according to an embodiment of the present disclosure.

As illustrated in FIG. 17, the timing controller 130 can control the shift clocks GCLK1, GCLK2, ECLK1, and ECLK2 to be generated during the emission prohibiting section P-IR, whereas the emission prohibiting section P-IR and the emission permitting section A-IR are controlled by modulating the shift clocks GCLK1, GCLK2, ECLK1, and ECLK2 to temporarily stop the shift clocks GCLK1, GCLK2, ECLK1, and ECLK2 during the emission permitting section A-IR. The start pulses GVSP and EVSP are not generated during the emission permitting section A-IR. Therefore, the timing controller 130 can control the scan driver 121 and the EM driver 122 to set the emission permitting section A-IR to a desired time.

Figure 18:
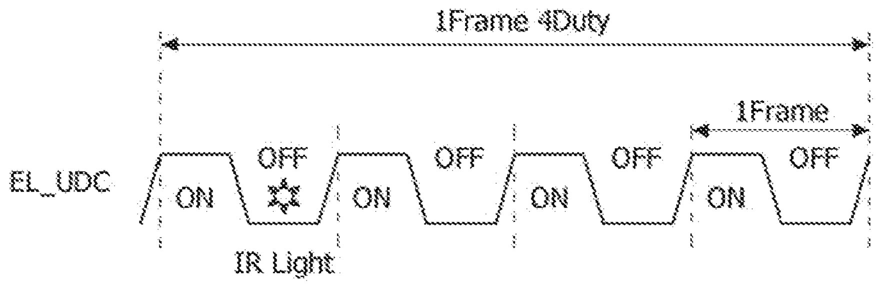
FIG. 18 is a diagram illustrating an example in which an infrared light source is driven during a non-driving period of the second pixel region according to an embodiment of the present disclosure.

FIG. 18 is a diagram illustrating an example in which an infrared light source is driven during a non-driving period of a second pixel region CA according to an embodiment of the present disclosure. In FIG. 18, reference numeral “EL UDC” indicates an average luminance duty ratio of the second pixel region CA.

Referring to FIG. 18, the infrared light source 201 can be turned on during the non-driving period of the second pixel region CA under the control of the timing controller 130. The timing controller 130 can set the non-driving period, in which pixels present in at least a portion of the second pixel region CA are not simultaneously driven, as the emission permitting section A-IR. Here, at least a portion of the second pixel region CA can be an entire region of the second pixel region CA, or a pixel region in the second pixel region CA, which overlaps with the infrared light source 201.

As described above, the timing controller 130 can modulate the shift clocks GCLK1, GCLK2, ECLK1, and ECLK2, set the non-driving period in which the pixels are not driven in at least a portion of the second pixel region CA, and drive the infrared light source 201 in the non-driving period. During the non-driving period, the infrared light source can be turned on so that the user’s face can be recognized. When the facial recognition is completed, the infrared light source is turned off so that the non-driving period ends, and then the scanning of the second pixel region CA can be resumed and the corresponding subpixels can be allowed to operate. Since the infrared light source 201 is driven within the non-driving period of the second pixel region CA, any abnormal change in luminance of the screen caused by the infrared light is not recognized. For example, even if light emitted by the infrared light source 201 changes a capacitance in the capacitor Cst, this will not matter, since the corresponding subpixel is controlled to be in the off state during the emission permitting section A-IR.

Figure 19:
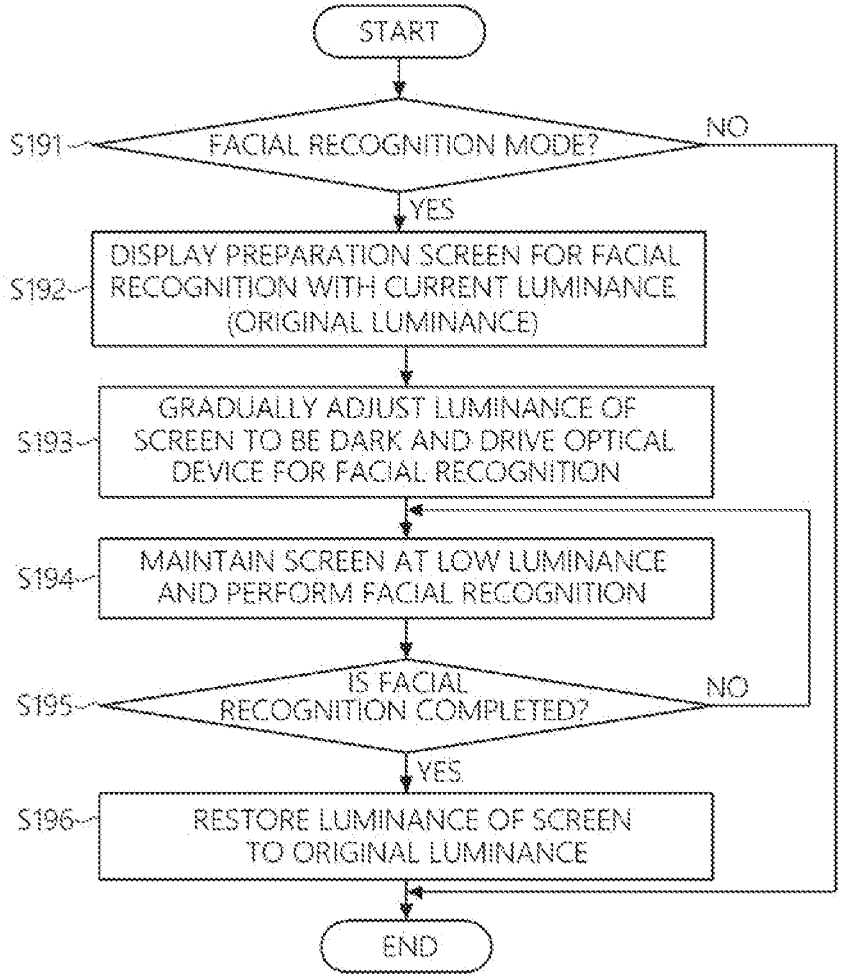
FIG. 19 is a flowchart illustrating a method of controlling a luminance of a screen in a facial recognition mode according to an embodiment of the present disclosure.
Figure 20:
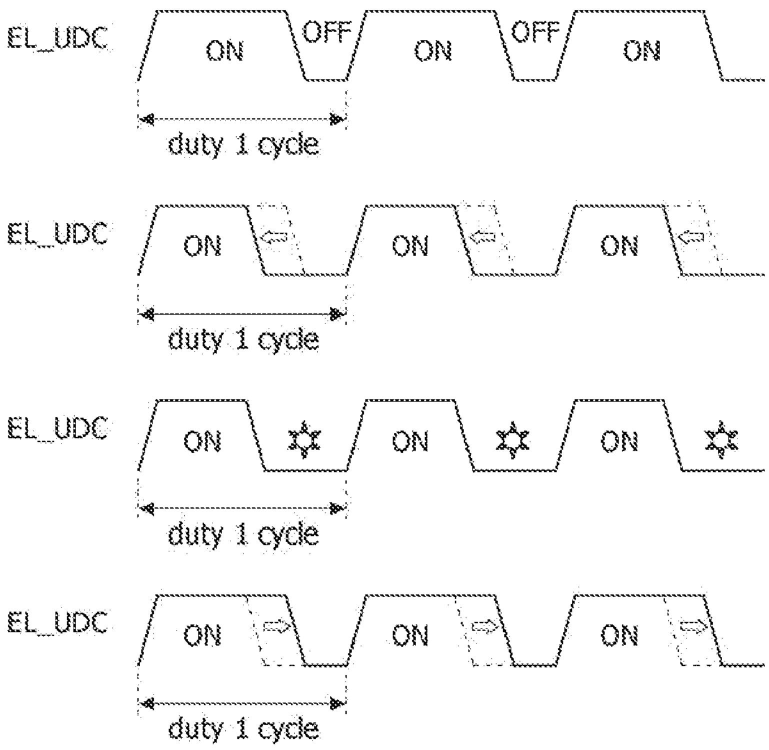
FIG. 20 is a diagram illustrating changes in average luminance of the screen obtained by performing the method of controlling the luminance as illustrated in FIG. 19 according to an embodiment of the present disclosure.

FIG. 19 is a flowchart illustrating a method of controlling a luminance of a screen in a facial recognition mode according to an embodiment of the present disclosure. FIG. 20 is a diagram illustrating changes in average luminance of the screen obtained by performing the method of controlling the luminance as illustrated in FIG. 19. In FIG. 20, reference numeral "EL UDC" indicates an average luminance duty ratio of a second pixel region CA.

Referring to FIGS. 19 and 20, a host system enters the facial recognition mode when an event requiring facial recognition occurs (S191).

In the facial recognition mode, a display device displays a preset preparation screen on a display panel 100 with a current luminance (original luminance) of the display panel 100. The preparation screen can guide the user to look at the screen (S192).

In a state in which the preparation screen is displayed on the display panel 100, a timing controller 130 gradually lowers a grayscale value of pixel data so that an average luminance of the screen is gradually lowered and drives an infrared light source 201 (S193). In this situation, the average luminance of an entire screen can be lowered or the luminance of just the second pixel region CA can be lowered to a preset luminance value. Since the preparation screen should be displayed, the luminance of the screen is not lowered to the luminance of the black grayscale. In operation S193, a scan pulse and an EM pulse can be controlled by the method of controlling the emission permitting section A-IR according to the above-described embodiment. Since the luminance of the screen is lowered, a decrease in luminance of the pixels caused by the infrared light cannot be visually recognized by the user.

In a state in which the luminance of the screen is maintained at a low luminance, the infrared light reflected by the user's face is received by an infrared imaging device 202, and the user's face is recognized based on a captured infrared light image (S194). In an authentication module of the host system, when the face is successfully recognized and the facial recognition ends, the timing controller 130 increases the luminance of the screen to the original luminance value (S195 and S196).

According to the present disclosure, since a sensor is disposed on a screen on which an image is displayed, a full-screen display can be implemented (e.g., a notch or hole for a front facing camera and light sources can be eliminated).

According to the present disclosure, in order to prevent a change in electrical characteristics of transistors constituting a pixel circuit due to infrared light when an infrared light source disposed under a second pixel region of a display panel is driven and infrared light is radiated to the outside through pixels, an emission permitting section is set within a non-driving period of pixels in the second pixel region, and the infrared light source is driven within the emission permitting section. As a result, according to the present disclosure, it is possible to prevent any abnormal operation of the pixel circuit caused by the infrared light in the second pixel region.

According to the present disclosure, since the infrared light is emitted before the pixel circuit disposed in the second pixel region is initialized, even when a change in voltage of a capacitor occurs due to a change in characteristics of switching elements constituting the pixel circuit, initialization and sampling operations are performed after the infrared light source is turned off, and thus the pixels cannot emit light. Therefore, even when the voltage of the capacitor of the pixel circuit is changed due to the infrared light, it is possible to prevent a phenomenon in which a change in luminance of the pixels is visually recognized by the user.

According to the present disclosure, in a facial recognition mode, by driving the infrared light source in a state in which a luminance of the screen is gradually lowered, it is possible to reduce a phenomenon in which a change in luminance of the pixels caused by the infrared light is visually recognized.

The effects of the present disclosure are not limited to the above-mentioned effects, and other effects that are not mentioned will be apparently understood by those skilled in the art from the following description and the appended claims.

The objects to be achieved by the present disclosure, the means for achieving the objects, and effects of the present disclosure described above are examples, and thus, the scope of the claims is not limited thereto.

Although the embodiments of the present disclosure have been described in more detail with reference to the accompanying drawings, the present disclosure is not limited thereto and can be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display device comprising:

a display panel configured to display an input image across a first subpixel region and a second subpixel region;

a display panel driver configured to supply pixel data of the input image to subpixels of the display panel;

a light source disposed under the display panel in an area overlapped by the second subpixel region; and a controller configured to drive the light source in an emission permitting section set within a non-driving period of a group of subpixels among the subpixels that are disposed in at least a portion of the second subpixel region, wherein the controller is further configured to set an emission prohibiting section and scan the second subpixel region and drive the group of the subpixels in the second subpixel region during the emission prohibiting section, and turn the light source off in the emission prohibiting section and turn the light source on in the emission permitting section.

2. The display device of claim 1, wherein the light source is configured to radiate infrared light, and wherein the group of subpixels disposed in the at least the portion of the second pixel region include subpixels located within a path of the infrared light radiated by the light source.

3. The display device of claim 1, wherein the second subpixel region includes one or more light-transmitting parts disposed between subpixels among the group of sub-pixels disposed in the at least the portion of the second pixel region.

4. The display device of claim 1, wherein the scan pulse is applied to the group of subpixels in the second subpixel region during the emission prohibiting section, wherein a voltage of the emission control pulse is inverted to a gate on voltage in at least one section of the emission prohibiting section, and wherein the transistors of the group of subpixels are turned on in response to the gate on voltage.

5. The display device of claim 1, wherein the controller is further configured to initialize the group of subpixels in the second subpixel region during the emission prohibiting section after the emission permitting section.

6. The display device of claim 1, wherein each subpixel among the group of the subpixels in the second subpixel region includes:

a light-emitting element;

a driving element including a first electrode connected to a first node, a gate electrode connected to a second node, and a third electrode connected to a third node, and drives the light-emitting element;

a first switching element configured to be turned on in response to a gate on voltage of a scan pulse and connect a data line, to which a data voltage of the pixel data is applied, to the second node;

a second switching element configured to be turned on in response to a gate on voltage of an emission control pulse and supply a pixel driving voltage to the first node; and a capacitor configured to store a gate-source voltage of the driving element.

7. The display device of claim 6, wherein each subpixel among the group of the subpixels in the second subpixel region further includes a third switching element configured to be turned on in response to the gate on voltage of the scan pulse and connect a reference voltage line to the third node.

8. The display device of claim 1, wherein each subpixel among the group of the subpixels in the second subpixel region includes:

a light-emitting element;

a driving element including a first electrode connected to a first node, a gate electrode connected to a second node, and a third electrode connected to a third node, the driving element being configured to drive the light-emitting element;

a first switching element configured to be turned on in response to a gate on voltage of an $N^{th}$ scan pulse N and connect a data line to which a data voltage of the pixel data is applied to the first node, where N is a natural number greater than zero;

a second switching element configured to be turned on in response to a gate on voltage of an emission control pulse and supply a pixel driving voltage to the first node;

a third switching element configured to be turned on in response to the gate on voltage of the $N^{th}$ scan pulse and connect the second node to the third node;

a fourth switching element configured to be turned on in response to the gate on voltage of the emission control pulse and connect the third node to a fourth node;

a fifth switching element configured to be turned on in response to a gate on voltage of an $(N-1)^{th}$ scan pulse and connect the second node to a first power line to which an initialization voltage is applied;

a sixth switching element configured to be turned on in response to the gate on voltage of the $(N-1)^{th}$ scan pulse or $N^{th}$ scan pulse and connect the first power line to the fourth node; and a capacitor disposed between and connected to a second power line to which the pixel driving voltage is applied and the second node, wherein an anode of the light-emitting element is connected to the fourth node.

9. The display device of claim 8, wherein a driving period of the group of subpixels in the second subpixel region is divided into an initialization period, a sampling period, and an emission period, wherein the $N^{th}$ scan pulse is generated as a gate on voltage in the sampling period and applied to the group of subpixels through a first gate line, wherein the $(N-1)^{th}$ scan pulse is generated as a gate on voltage in the initialization period and applied to the group of subpixels through a second gate line, and wherein the emission control pulse is generated as a gate off voltage in the initialization period and the sampling period and applied to the group subpixels through a third gate line.

10. The display device of claim 9, wherein the controller is further configured to turn the light source off before the initialization period of the group of subpixels in the second subpixel region.

11. The display device of claim 1, wherein the display panel driver includes:

a first gate driver configured to supply a scan pulse to subpixels in the first and second subpixel regions; and a second gate driver configured to supply an emission control pulse to the subpixels in the first and second subpixel regions, wherein, during the emission permitting section, the scan pulse and the emission control pulse maintain a gate off voltage, and wherein each of the subpixels includes one or more transistors that are turned off in response to the gate off voltage.

12. A display device comprising:

a display panel configured to display an input image across a first subpixel region and a second subpixel region;

a display panel driver configured to supply pixel data of the input image to subpixels of the display panel;

a light source disposed under the display panel in an area overlapped by the second subpixel region; and a controller configured to drive the light source in an emission permitting section set within a non-driving period of a group of subpixels among the subpixels that are disposed in at least a portion of the second subpixel region, wherein the controller is further configured to:

lower a luminance of subpixels in the first and second subpixel regions to a luminance level that is less than an original luminance and turn on the light source in a facial recognition mode, and in response to a facial recognition being completed, turn the light source off and restore the luminance of the subpixels in the first and second subpixel regions to the original luminance.

13. A method of driving a display device, the method comprising:

displaying an input image across a first subpixel region and a second subpixel region of a display panel;

driving, by a controller in the display device, a light source disposed under the display panel in an area overlapped by the second subpixel region in an emission permitting section set within a non-driving period of a group of subpixels among the subpixels that are disposed in at least a portion of the second subpixel region;

setting, by the controller, an emission prohibiting section within a period in which the second subpixel region is scanned; and turning off the light source, by the controller, in the emission prohibiting section and turning on the light source in the emission permitting section.

14. The method of claim 13, further comprising radiating infrared light generated by the light source to the group of subpixels disposed in the at least the portion of the second subpixel region.

15. The method of claim 13, further comprising initializing the group subpixels in the second subpixel region during the emission prohibiting section after the emission permitting section.

16. The method of claim 13, further comprising:

supplying a scan pulse to subpixels in the first and second subpixel regions;

supplying an emission control pulse to the subpixels in the first and second subpixel regions;

maintaining a gate off voltage of the scan pulse and the emission control pulse during the emission permitting section; and turning off at least one transistor included in the subpixels in response to the gate off voltage.

17. The method of claim 16, further comprising:

applying the scan pulse to the subpixels in the second subpixel region during the emission prohibiting section;

inverting a voltage of the emission control pulse to a gate on voltage in at least one section of the emission prohibiting section; and turning on the at least one transistor in response to the gate on voltage.

18. The method of claim 13, further comprising:

lowering a luminance of subpixels in the first and second subpixel regions to a luminance level that is less than an original luminance and turning on the light source in a facial recognition mode; and in response to a facial recognition being completed, turning the light source off and restoring the luminance of the subpixels in the first and second subpixel regions to the original luminance.

* * * * *